(12) United States Patent
Lalgudi et al.

(10) Patent No.: US 12,223,247 B2
(45) Date of Patent: Feb. 11, 2025

(54) LOGIC CELL STRUCTURES AND RELATED METHODS

(71) Applicant: TAIWAN SEMICONDUCTOR MANUFACTURING COMPANY LTD., Hsinchu (TW)

(72) Inventors: Kumar Lalgudi, Fremont, CA (US); Ranjith Kumar, Hsinchu (TW); Mohammed Rabiul Islam, Austin, TX (US); Jianyang Xu, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 18/472,280

(22) Filed: Sep. 22, 2023

(65) Prior Publication Data

US 2024/0012975 A1    Jan. 11, 2024

Related U.S. Application Data

(62) Division of application No. 17/232,525, filed on Apr. 16, 2021, now Pat. No. 11,816,412.

(51) Int. Cl.
| | |
|---|---|
| *G06F 30/367* | (2020.01) |
| *G06F 30/337* | (2020.01) |
| *G06F 30/373* | (2020.01) |
| *G06F 30/392* | (2020.01) |
| *G06F 30/398* | (2020.01) |
| *G06F 119/06* | (2020.01) |
| *G06F 119/12* | (2020.01) |

(52) U.S. Cl.
CPC .......... *G06F 30/367* (2020.01); *G06F 30/373* (2020.01); *G06F 30/392* (2020.01); *G06F 30/337* (2020.01); *G06F 30/398* (2020.01); *G06F 2119/06* (2020.01); *G06F 2119/12* (2020.01)

(58) Field of Classification Search
CPC .... G06F 30/367; G06F 30/373; G06F 30/392; G06F 30/398; G06F 30/377; G06F 30/337; G06F 2119/06; G06F 2119/12
USPC ........... 716/113, 114, 122, 134, 136; 703/16
See application file for complete search history.

(56) References Cited

U.S. PATENT DOCUMENTS

| | | | | |
|---|---|---|---|---|
| 6,051,031 A | * | 4/2000 | Shubat | G06F 30/327 703/15 |
| 6,593,792 B2 | * | 7/2003 | Fujii | H03K 5/1506 327/276 |

(Continued)

FOREIGN PATENT DOCUMENTS

| | | | |
|---|---|---|---|
| JP | 05343934 A | * | 12/1993 |
| JP | 2000100950 A | * | 4/2000 |

*Primary Examiner* — Phallaka Kik
(74) *Attorney, Agent, or Firm* — WPAT Law; Anthony King

(57) ABSTRACT

A method of forming an integrated circuit structure is provided. The method includes: providing a logic cell structure including a first input node, a second input node, and a pulling network connected to a reference voltage and an output node, wherein the pulling network includes a plurality of transistor segments; determining a delay associated with at least one of the first input node and the second input node; and connecting the plurality of transistor segments to the first input node, the second input node and the output node based at least in part on the determined delay.

20 Claims, 25 Drawing Sheets addressing a timing condition of a logic cell having multiple inputs by allocating a current-driving capability of the logic cell unequally among the inputs without substantially changing a size of the logic cell ~1201

(56) References Cited

U.S. PATENT DOCUMENTS

| | | | |
|---|---|---|---|
| 8,015,517 B1* | 9/2011 | Reis | G06F 30/327 |
| | | | 716/132 |
| 8,898,610 B1* | 11/2014 | Tagore-Brage | G06F 30/30 |
| | | | 716/119 |
| 2001/0048333 A1* | 12/2001 | Fujii | H03K 5/133 |
| | | | 327/270 |
| 2005/0140393 A1* | 6/2005 | Muraya | H03K 19/018571 |
| | | | 326/83 |
| 2005/0280401 A1* | 12/2005 | Plankensteiner | H03K 17/122 |
| | | | 323/222 |
| 2006/0061395 A1* | 3/2006 | Noto | H03K 17/164 |
| | | | 327/108 |
| 2007/0006106 A1* | 1/2007 | Bartling | G06F 30/327 |
| | | | 716/113 |
| 2007/0006109 A1* | 1/2007 | Bartling | G06F 30/327 |
| | | | 716/113 |
| 2008/0106945 A1* | 5/2008 | Jo | G11C 16/28 |
| | | | 365/185.21 |
| 2009/0007046 A1* | 1/2009 | Lerner | H01L 29/7802 |
| | | | 257/E29.198 |
| 2022/0335191 A1* | 10/2022 | Lalgudi | G06F 30/367 |

\* cited by examiner

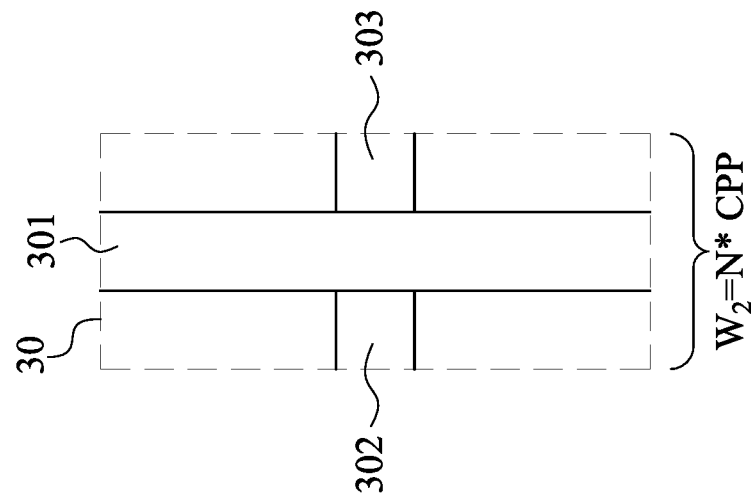
FIG. 3C(2)
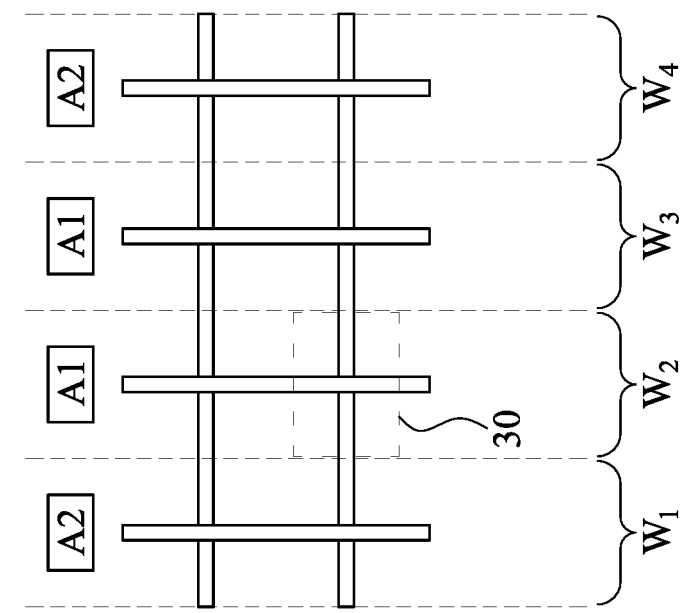
FIG. 3C(1)

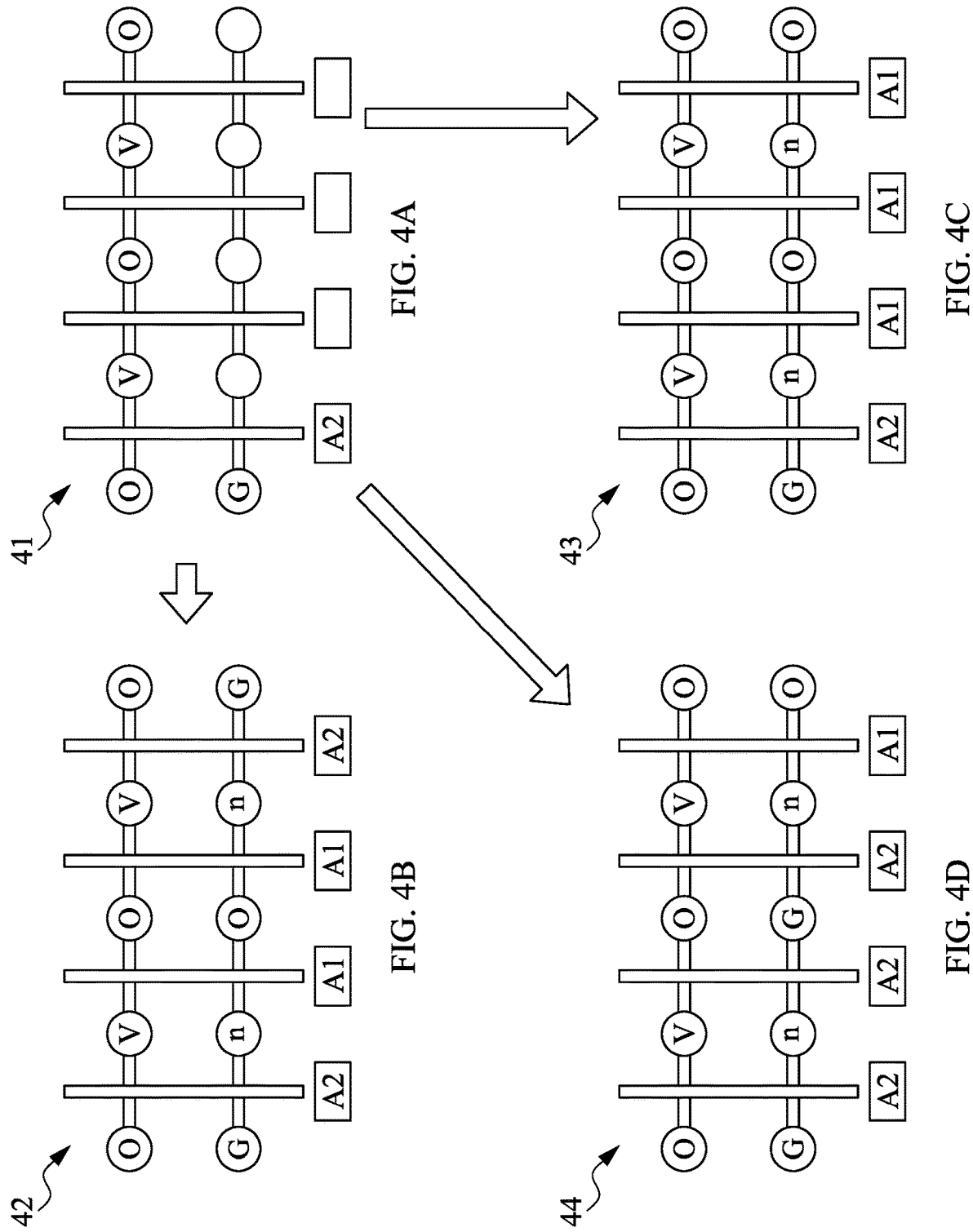

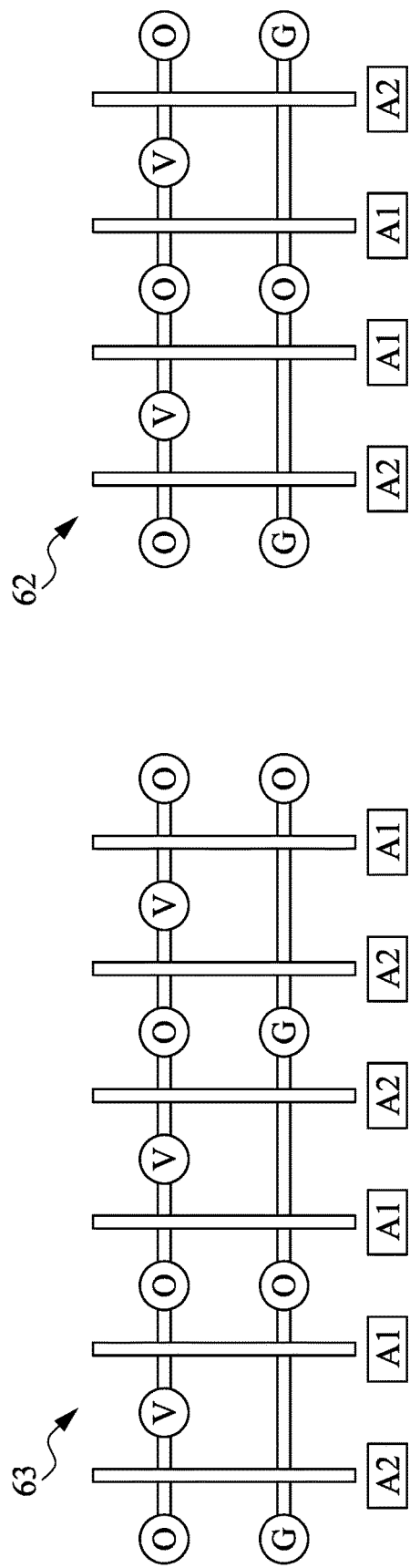
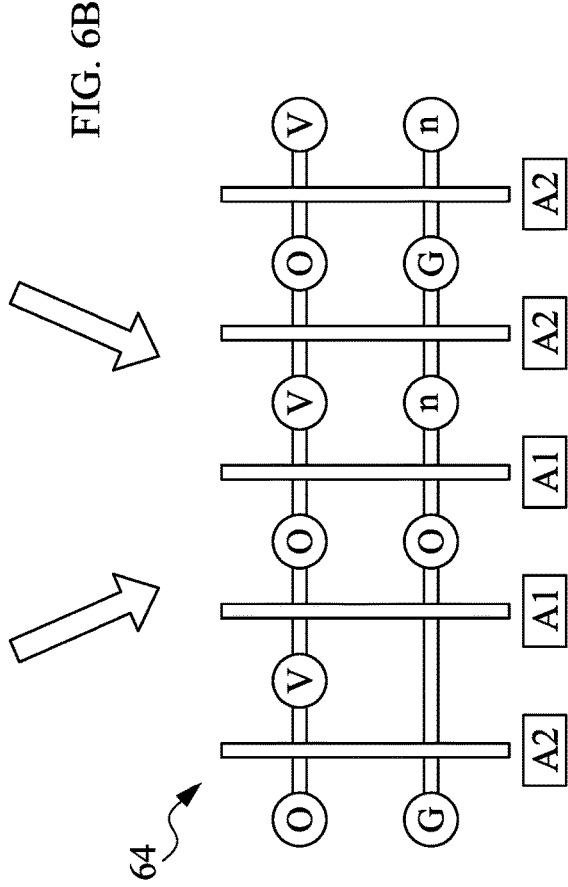
FIG. 6B
FIG. 6C
FIG. 6D

| Cell Type | A1->O Speed | A2->O Speed | A1->O Power | A2->O Power | Area |
|---|---|---|---|---|---|
| ND2-D2 | 1.00 | 1.00 | 1.00 | 0.99 | 5 CPP |
| ND2-D3 | 1.22 | 1.18 | 1.50 | 1.49 | 7 CPP |
| ND2-D2P5 | 1.03 | 1.11 | 1.18 | 1.30 | 6 CPP |

FIG. 10 addressing a timing condition of a logic cell having multiple inputs by allocating a current-driving capability of the logic cell unequally among the inputs without substantially changing a size of the logic cell ~1201

FIG. 12

LOGIC CELL STRUCTURES AND RELATED METHODS

CROSS REFERENCE TO RELATED APPLICATION

This application is a divisional application of prior-filed U.S. application Ser. No. 17/232,525, filed on 16 Apr. 2021, and claims the priority thereto.

BACKGROUND

Today, an integrated circuit (IC) is designed by placing various cells with different functions. The cells may be standard cells that have a uniform dimension in one direction, and the dimension may be an integer multiple of a library-specific minimum dimension. The cells can be logic gates and combinational logic circuits. For convenience of IC design, a library including frequently used cells with their corresponding layouts are established. Therefore, when designing an IC, a designer can select desired standard cells from the library and place them in an automatic placement and routing block, such that a layout of the integrated circuit can be created. For example, when designing an integrated circuit having specific functions, standard cells are selected from a pre-designed standard cell library. Next, designers, or EDA (Electronic Design Automation) or ECAD (Electronic Computer-Aided Design) tools draw out design layouts of the integrated circuit including the selected standard cells and/or non-standard custom cells. The design layouts are converted to photomasks, and semiconductor integrated circuits can then be manufactured when patterns of various layers—defined by photography processes with the photomasks—are transferred to a substrate.

The performance of an IC may be improved at the cell level. The performance criteria may include power consumption, area size, and the speed at which a signal can pass the cell.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 3A-3G illustrate circuit cells and layouts, in accordance with at least one embodiment of the present disclosure.

FIGS. 4A-4D illustrate circuit cells and layouts, in accordance with at least one embodiment of the present disclosure.

FIGS. 6A-6D illustrate circuit cells and layouts, in accordance with at least one embodiment of the present disclosure.

FIG. 10 shows the performance of cells and circuits in accordance with at least one embodiment of the present disclosure.

FIGS. 11-12 show exemplary method flowcharts, in accordance with at least one embodiment of the present disclosure.

DETAILED DESCRIPTION OF THE DISCLOSURE

Figure 1:
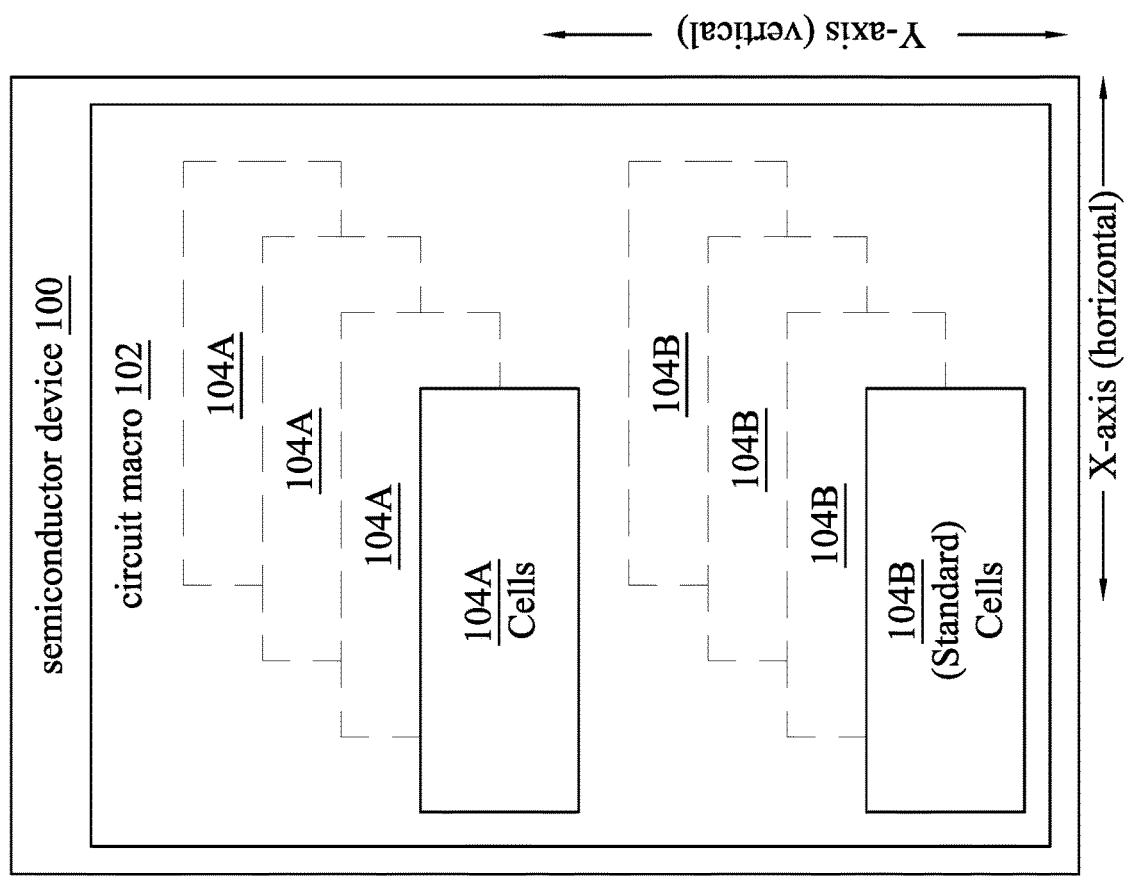
FIG. 1 is a block diagram of a semiconductor device, in accordance with at least one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90° or at other orientations) and the spatially relative descriptors used herein may likewise be interpreted accordingly.

Further, it will be understood that when an element is referred to as being "connected to" or "coupled to" another element, it may be directly connected to or coupled to the other element, or intervening elements may be present.

Embodiments are generally discussed with respect to the use of standard cells in the design of application-specific integrated circuits (ASICs), though embodiments are not so limited. A standard cell represents a design abstraction that encapsulates a low-level, VLSI (very-large-scale integration) layout into an abstract logic representation (e.g., a NAND gate or other logic gate). Standard cell-based design allows one designer to focus on the logical or functional aspect of a digital design, while another designer focuses on the implementation aspect of the design, and is critical in facilitating the efficient design of everything from simple single-function ICs to complex multi-million gate system-on-a-chip (SoC) devices.

The standard cell may be of a certain height, H, which may be expressed as a standard unit, such as single-height, double-height (2 times single height), triple-height (3 times single height), and so on. The standard cell is also of a certain width, which may be expressed as a unit of contact poly pitch (CPP). As an example, standard cells in a library may range in height from single to triple height, and in width from 3 CPP to 30 CPP wide. For purposes of the following description, the minimum unit to shift a cell horizontally is referred to as a single CPP unit. However, any similar measurement other than CPP may be used to denote this minimum shift unit.

In the present disclosure, the term "height" used in connection with a cell (e.g., "cell height" or a "height of standard cells") generally refers to a dimension (e.g., length or distance) along the column direction in a plan view. Similarly, in the present disclosure, the term "width" used in connection with a cell (e.g., "cell width" or a "width of standard cells") generally refers to a dimension along the row direction in a plan view.

In the following description, a signal is asserted with a logical high value to activate a corresponding device when the device is active high. In contrast, the signal is de-asserted with a low logical value to deactivate the corresponding device. When the device is active low, however, the signal is asserted with a low logical value to activate the device, and is de-asserted with a high logical value to deactivate the device. Examples of active-high devices include the N-type (i.e., n-channel) metal-oxide metal-oxide-semiconductor field-effect transistor (MOSFET, also known as metal-oxide-silicon transistor or MOS transistor) or simply referred to as an NMOS, and the NPN-type bipolar junction transistor (bipolar transistor or BJT). Examples of active-low devices include the PMOS and the PNP-type BJT.

In the present disclosure, not every layer of a cell or a layout is depicted in the drawings. One of ordinary skill in the art should understand that the cell or the layout can include more layers to implement functionality of the cell and these layers are omitted merely for convenience of description.

FIG. 1 is a block diagram of a semiconductor device 100, in accordance with at least one embodiment of the present disclosure.

The semiconductor device 100 includes, among other things, a circuit macro (hereinafter, macro) 102, which may be an SRAM macro or a different macro. The macro 102 includes, among other things, one or more cells 104A and one or more cells 104B. The cells 104A and 104B may be standard cells. The cells 104A and 104B may have an asymmetric arrangement that treats different inputs to the cells differently. The cells 104A and 104B may be standard cells with an asymmetric arrangement. The asymmetric arrangement may help improve circuit performance such as power consumption, size and speed. The cells 104A and 104B may include circuits/cells described hereinafter.

Figure 2A:
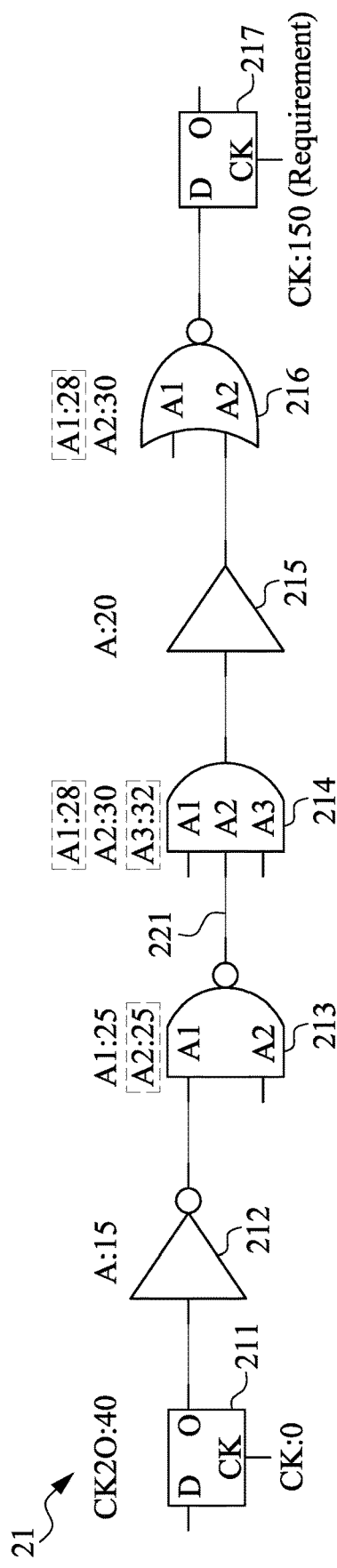
FIGS. 2A and 2B illustrate circuits in accordance with at least one embodiment of the present disclosure.

FIG. 2A illustrates a circuit 21 that includes several constituent blocks 211, 212, 213, 214, 215, 216, 217 and its timing-critical path 221. Each of the blocks 211 . . . 217 may be implemented in digital cells or standard cells.

The path 221 has been identified as timing-critical, with a required delay of 150 time units. Each of the blocks 211 . . . 217 have input-to-output delays and therefore contribute to the total delay. Each of the blocks 211 . . . 217 may have different amounts of delay, as indicated in FIG. 2A. Within the same block having multiple inputs, each of the inputs may involve different amounts of delay.

In the example of FIG. 2A, block 211 is a D flip-flop with a delay of 40 time units. In the description that follow, the term "time units" may be omitted for simplicity. Block 212 is an inverter with a delay of 15. Block 213 is a 2-input NAND gate with a delay of 25 for both inputs. Block 214 is a 3-input AND gate with the inputs A1, A2 and A3 having a delay amount of 28, 30 and 32, respectively. Block 215 is an inverter with a delay of 20. Block 216 is a 2-input NOR gate with the inputs A1 and A2 having a delay amount of 28 and 30, respectively.

It should be evident that the circuit 21 in FIG. 2A is merely an example; actual circuits may have other types of blocks and cells.

Assume that the required time delay for the circuit 21 is 150. At the current configuration, the actual delay amount of the circuit 21 is 40+15+25+30+20+30+0=160, which exceeds the tolerable amount of 150. Hence, the circuit 21 is to be modified.

One or more of the blocks 211 . . . 217 may be re-designed for better timing performance. In some comparative approaches, it is possible to increase the size of a block/cell to increase the current-driving capability and thereby shorten the rise and/or fall time of the block/cell. For example, it is possible to replace the block 213 by another 2-input NAND gate with each of the constituent transistors having its size doubled. That way, the delay associated with both inputs A1 and A2 of the NAND gate will be reduced by approximately the same amount. If the reduction in delay is sufficiently large, then the timing issue will be resolved.

However, increasing the size of a cell comes with the expense of higher power consumption and less die area for other circuit components or a larger area for the entire circuit 21. This tradeoff is not necessarily always feasible or desired.

In other words, it may be beneficial to resolve the timing issue of a timing-critical path without substantially changing or increasing the size of the circuits/blocks/cells along the timing-critical path.

Figure 2B:
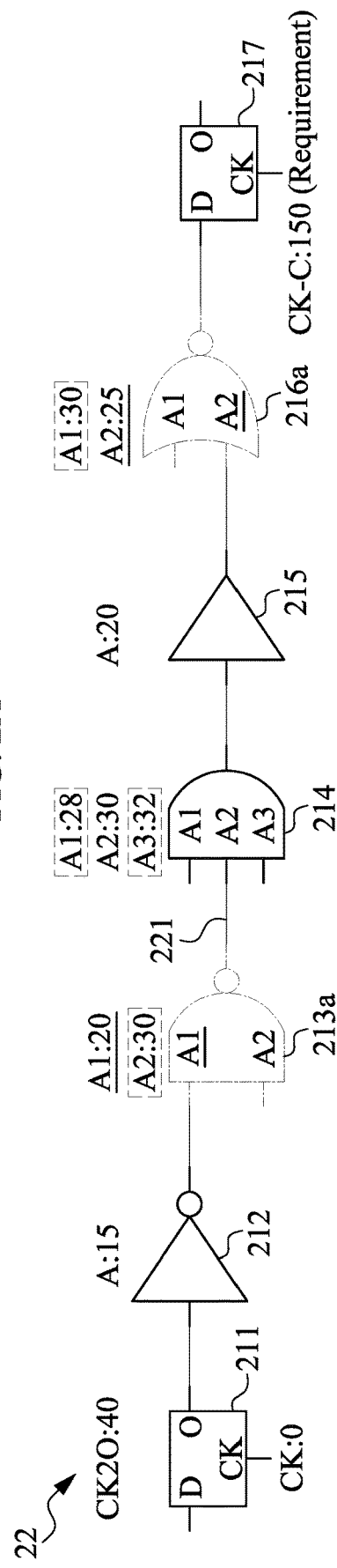

FIG. 2B illustrates a circuit 22 that resolves the timing issue of the circuit 21 without significantly increasing its physical size. The circuit 22 differs in that the blocks 213 and 216 of circuit 21 have been replaced by blocks 213a and 216a.

Similar to blocks 213 and 216, blocks 213a and 216a are also a 2-input NAND gate and a 2-input NOR gate, respectively. Moreover, blocks 213 and 216 have substantially identical size to blocks 213a and 216a, respectively. The difference is that the block 213a has an asymmetrical amount of delay with respect to the two inputs A1 and A2. A similar, though not entirely identical, difference exists between blocks 216 and 216a: the block 216a has a smaller delay with respect to input A2, but a larger delay with respect to input A1.

Specifically, block 213a is a 2-input NAND gate with a delay of 20 for input A1 and a delay of 30 for input A2. Block 216a is a 2-input NOR gate with the inputs A1 and A2 having a delay amount of 30 and 25, respectively.

Even though blocks 213a and 216a have an input whose delay has increased, the overall timing issue of the circuit 22 can still be resolved because the delay amounts with respect to the inputs of the blocks 213a and 216a along the timing-critical path 221 are reduced. At the current configuration, the delay amount along the timing-critical path 221 of the circuit 22 is 40+15+20+30+20+25+0=150, which meets the requirement of 150. Note that in some embodiments, the path that includes the input A2 of block 213 and the input A1 of block 216 in FIG. 2A does not form a part of a timing-critical path, and therefore this room in the timing budget can be exploited in the manner illustrated in FIG. 2B.

Figure 2C:
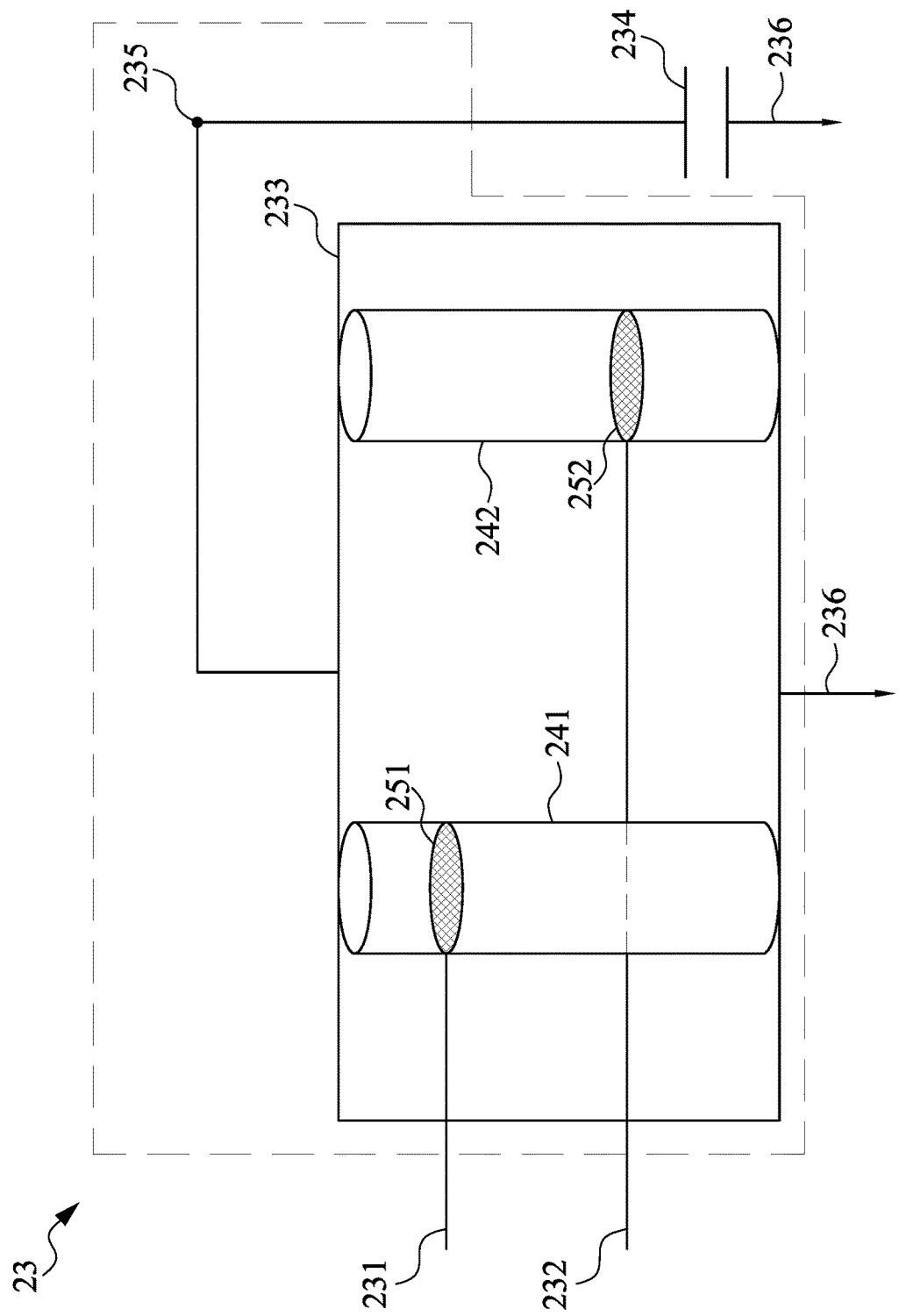
FIGS. 2C and 2D conceptually illustrate the asymmetric arrangement in more detail, in accordance with at least one embodiment of the present disclosure.
Figure 2D:
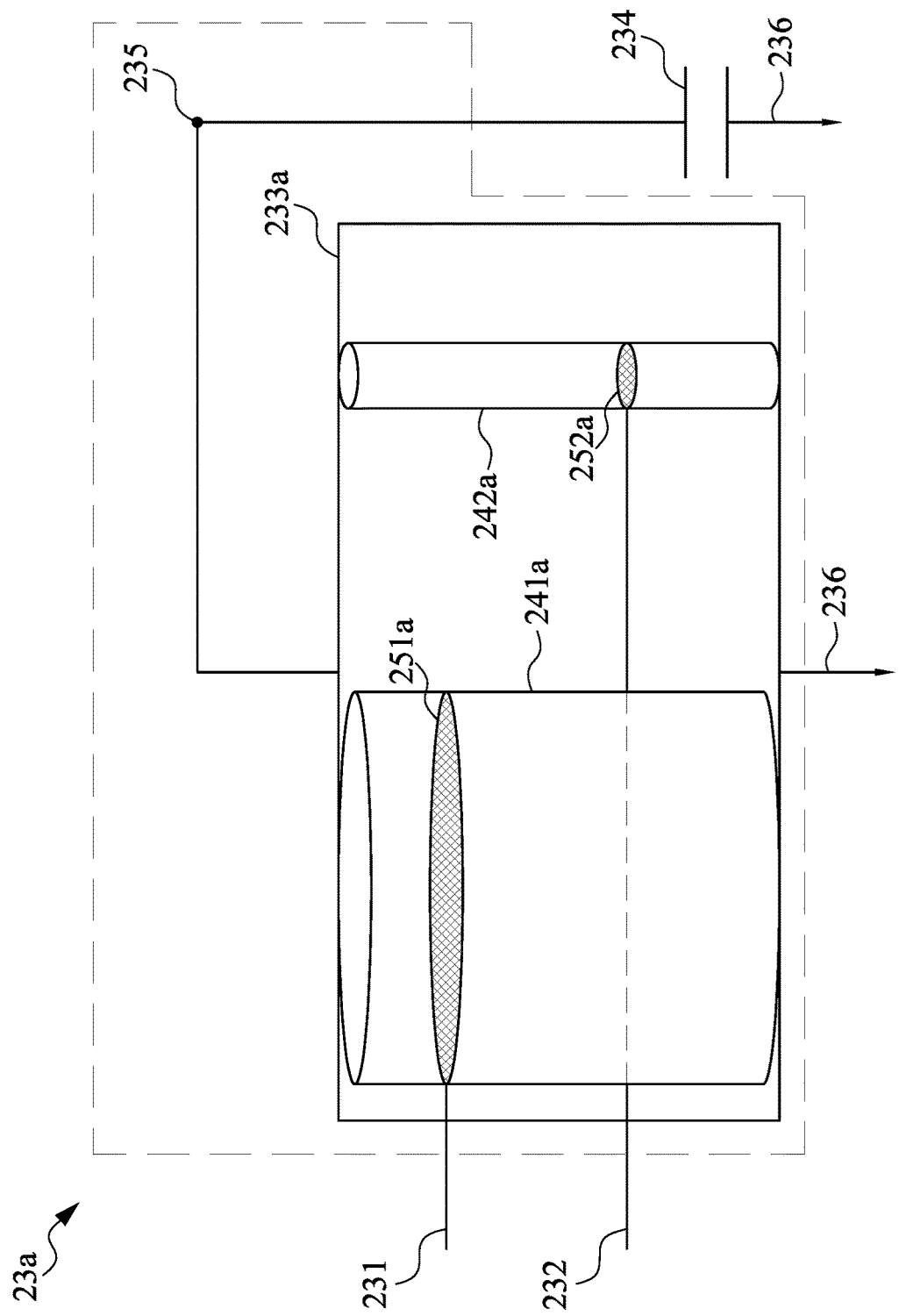

FIGS. 2C and 2D conceptually illustrate the asymmetric arrangement in more detail.

FIG. 2C illustrates a cell 23, which may be a logic cell. The cell 23 includes an input node 231, another input node 232, a pulling network 233, and an output node 235. The pulling network 233 and the capacitor 234 are electrically connected to a reference voltage 236, which may be a ground voltage or a power supply voltage. The output node 235 is also electrically connected to the capacitor 234. The capacitor 234 may be a parasitic capacitance.

The pulling network 233 includes two current channels 241 and 242, each having a flow-control mechanism 251 and 252, respectively. The current channels 241 and 242 are coupled to the input nodes 231 and 232 in such a manner that the input nodes 231 and 232 can control the on/off (or open/close) status of the flow-control mechanisms 251 and 252 to control the currents flowing through the current channels 241 and 242. When the signals at the input nodes 231 and 232 turn on the current channels 241 and 242, currents may flow the output node 235 to the reference voltage 236, thereby discharging the capacitor 234 and lowering the voltage level at the output node 235 to a value low enough to indicate a logical value, such as a logical low.

The current-driving capability of the current channels 241 and 242 at least partially determines the speed at which the capacitor 234 is charged/discharged and therefore determines the input-output delay of the cell 23. The larger the current-driving capability of the current channels 241 and 242, the lower the amount of delay with respect to the input nodes 231 and 232, respectively.

In some embodiments, the current channels 241 and 242 may be implemented by transistors, such as MOSFET and BJT. The MOSFET transistors may be of a planar type, a FinFET type, or a gate-all-around (GAA) type. The channel width of individual MOSFET transistors may at least partially determine the current-driving capability. The number of transistors may also at least partially determine the current-driving capability.

In the embodiment illustrated in FIG. 2C, the current channels 241 and 242 have a substantially identical amount of current-driving capability, and therefore the delay of the cell 23 may be substantially identical with respect to the input nodes 231 and 232.

FIG. 2D illustrates a cell 23a that has a size substantially identical to the cell 23. The differences between the cells 23 and 23a include the current channels 241a and 242a of the pulling network 233a of the cell 23a having unequal current-driving capability. In the embodiment illustrated in FIG. 2D, the current channel 241a can drive more current than the current channel 242a. Therefore, the cell 23a has asymmetrical amounts of delay with respect to the input nodes 231 and 232. The cell 23a can be useful where a timing-critical path passes through the input node 231, but not input node 232.

In other words, a timing issue in a circuit with multiple circuit blocks can be resolved without increasing the overall size by assigning or allocating the current-driving capability of one or more blocks asymmetrically among the multiple inputs of the blocks. The input(s) through which the timing-critical path passes can be allocated more current-driving capability than the other input(s) of the same block that are not part of a critical path.

Those skilled in the art understand that although the pulling networks 233 and 233a resemble pull-down networks, the principles revealed in FIGS. 2C and 2D are also applicable to pull-up networks.

FIGS. 3A-3G illustrate the asymmetrical arrangement in more detailed examples.

Figure 3A:
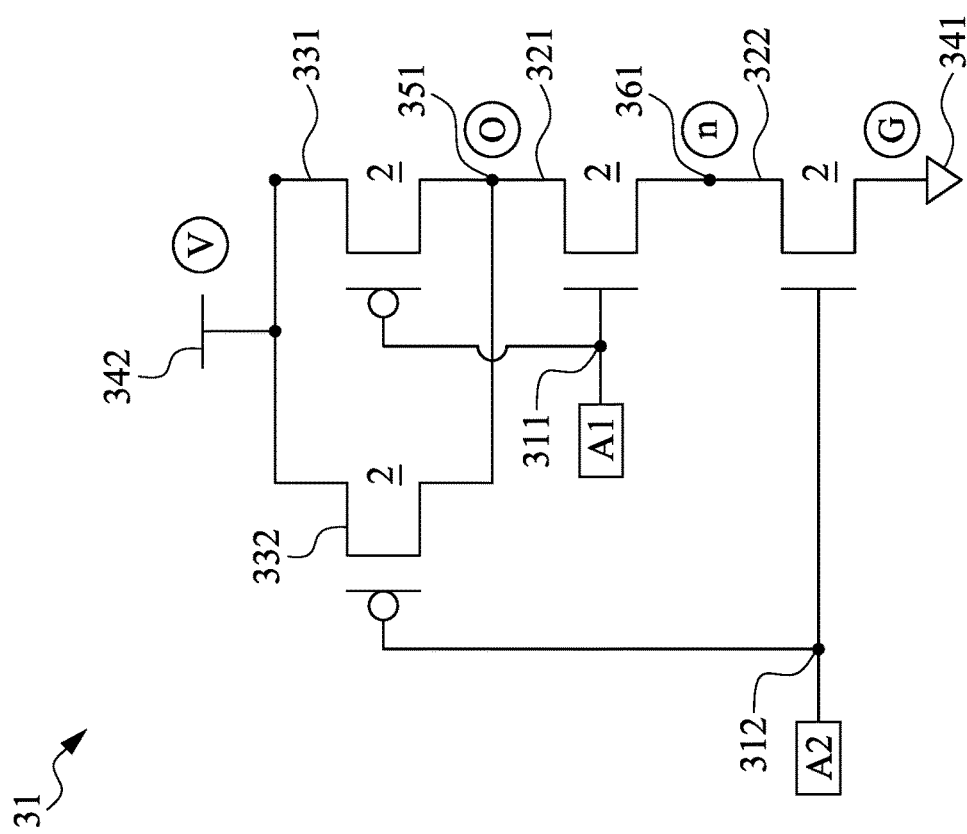
Figure 3B:
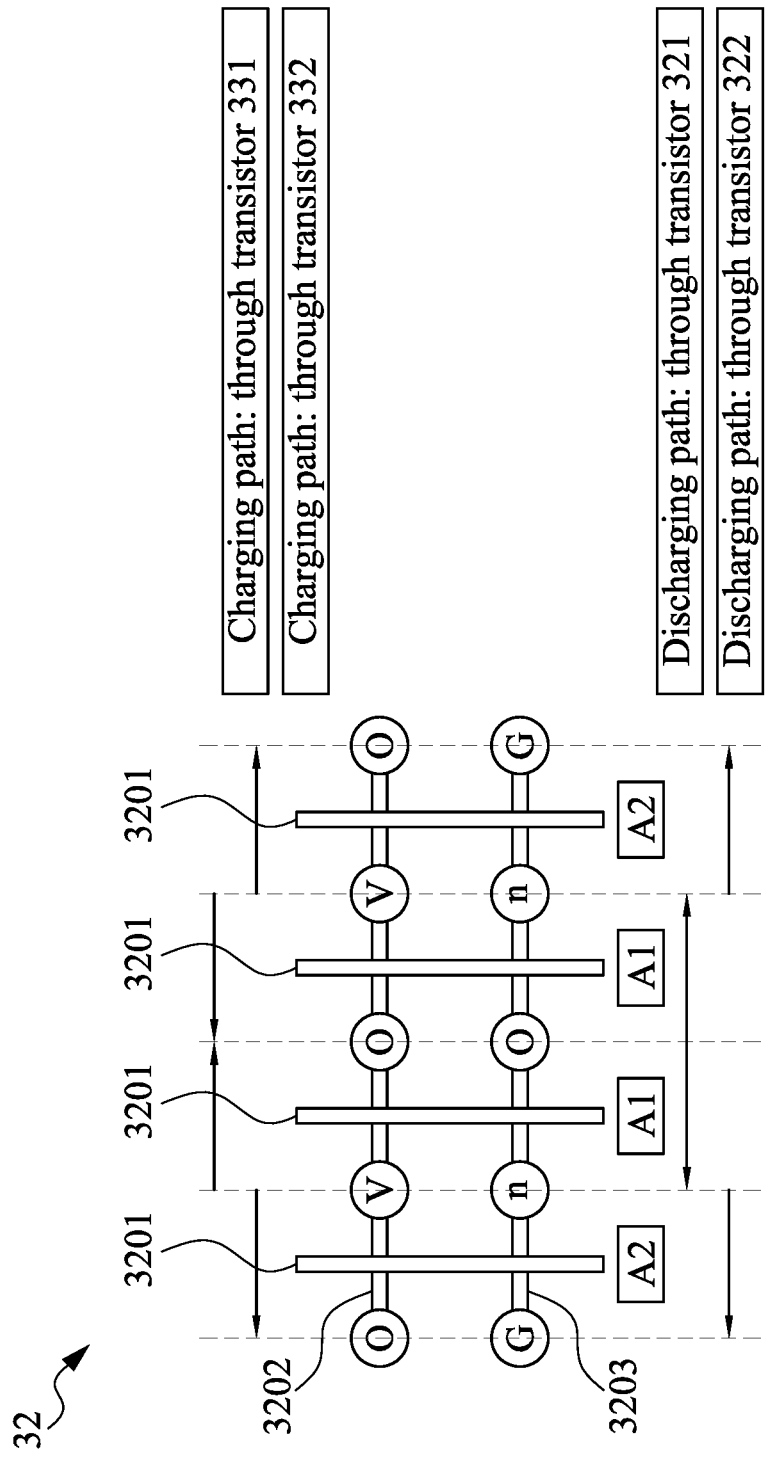

FIG. 3A illustrates a cell 31, which may be a logic cell or a standard cell, and FIG. 3B illustrates the layout 32 of the cell 31, according to some embodiments of the present disclosure.

The cell 31 in this example is a 2-input NAND gate implemented using CMOS transistors with two stacked (in series) n-devices (or n-channel transistors) 321, 322 as the pull-down network, and two P-devices (or p-channel transistors) transistor 331, 332 in parallel as the pull-up network. The cell 31 may also include input nodes 311, 312, reference voltages 341, 342, an output node 351 and a node 361 between the two transistors 321, 322 in series.

Signals A1 and A2 may be applied to the input nodes 311 and 312, respectively. That is, the signals A1 and A2 may be applied to the gate terminal of the transistors 321, 322, 331 and 332.

The reference voltage 341 may be a ground voltage or a negative power supply voltage, and the reference voltage 342 may be a positive power supply voltage. In the example of FIG. 3A, the reference voltage 342 is electrically connected to a source/drain terminal of the in-parallel transistors 331, 332, and the reference voltage 341 is electrically connected to a source/drain terminal of the transistor 322. The output node 351 is between the other source/drain terminal of the in-parallel transistors 331, 332 and a source/drain terminal of the transistor 321. The node 361 is between the two in-series transistors 321, 322.

For ease of illustration without intention to limit the disclosed subject matter, the reference voltages 341, 342 may be indicated in the drawings as G and V, respectively; the output node 351 may be indicated in the drawings as O; and the node 361 may be indicated in the drawings as n.

In FIG. 3A, the transistors 321, 322, 331, 332 are indicated with an underlined single-digit number "2" to indicate the current-driving capability of these transistors, as will be explained in more detail in reference to FIG. 3B.

FIG. 3B illustrates an exemplary layout 32 of the cell 31 in FIG. 3A, in accordance with some embodiments of the present disclosure.

The layout 32 includes multiple gate regions 3201, multiple source/drain regions 3202 for the p-channel devices, and multiple source/drain regions 3203 for the n-channel devices. In the example of FIG. 3B, the number of gate regions 3201 is four, and the numbers of the source/drain regions 3202 and the source/drain regions 3203 are five, although other numbers are also applicable.

The electrical nodes to which the source/drain regions 3202, 3203 are connected are indicated with circled letters of O, V, G and n, which correspond to the output node 351, the reference voltage 342, the reference voltage 341 and the node 361. The electrical nodes to which the gate regions 3201 are connected are indicated with A1 and A2 to show which input signal/node controls the conduction of the channel below the gate regions 3201.

As indicated in the layout 32, there exist two current paths that are controlled by the input A1 and along which electrical currents can flow from the reference voltage V through transistor 331 to the output O. These two current paths are indicated with arrows in FIG. 3B. Similarly, there exist two current paths that are controlled by the input A2 and along which electrical currents can flow from the reference voltage V through transistor 332 to the output O. In other words, the layout 32 can be interpreted in such a way that both inputs A1 and A2 are allocated with two p-type transistor segments (or more colloquially, "legs"), and hence the two underlined digits "2" near the transistors 331, 332 in FIG. 3A.

Similarly, there exist two current paths, indicated with arrows, that are controlled by the input A1 and along which electrical currents can flow from the output node O through transistor 321 to the node n; and another two current paths that are controlled by the input A2 and along which electrical currents can flow from the node n through transistor 322 to the reference voltage G. This also explains the two underlined digits "2" near the transistors 321, 322 in FIG. 3A.

Because of the symmetry in the allocation of the current-driving capability to the two inputs A1 and A2 (or the input nodes 311 and 312), the input-output delays of the cell 31 associated with the inputs A1 and A2 may be substantially identical ("symmetrical delay") to each other.

FIG. 3C(1) illustrates an exemplary relationship between the layout 32 and one of the constituent transistor segments 30, in accordance with some embodiments of the present disclosure.

FIG. 3C(1) shows that the layout 32 may include several transistor segments for the p- and n-channel devices. The transistor segment of the p-channel device has a substantially identical width as the transistor segment of the n-channel device directly below, although this is not a limitation to the disclosed subject matter. The transistor segments may have different width $W_1$, $W_2$, $W_3$ and $W_4$. These widths may be measured in terms of CPP. The widths $W_1$, $W_2$, $W_3$ and $W_4$ may differ from each other or may be substantially uniform. One of the transistor segments, 30, with a width $W_2$, has an enlarged view in FIG. 3C(2).

As indicated in FIG. 3C(2), the transistor segment 30 may include a gate region 301, a first source/drain region 302 and a second source/drain region 303. The signal/voltage applied to the gate region 301 may enable or disable the current flow between the two source/drain regions 302, 303. The signals/voltages applied to the source/drain regions 302, 303 may determine the direction of the current flow.

Those skilled in the art will understand that the layout 32 in FIGS. 3B, 3C(1) and 3C(2) is an abstraction, and not all layers and features are drawn.

The cell 31 and the layout 32 may be referred to as a 2-input NAND gate of size D2, where the "D2" indicates the average number of transistor legs per input.

Figure 3D:
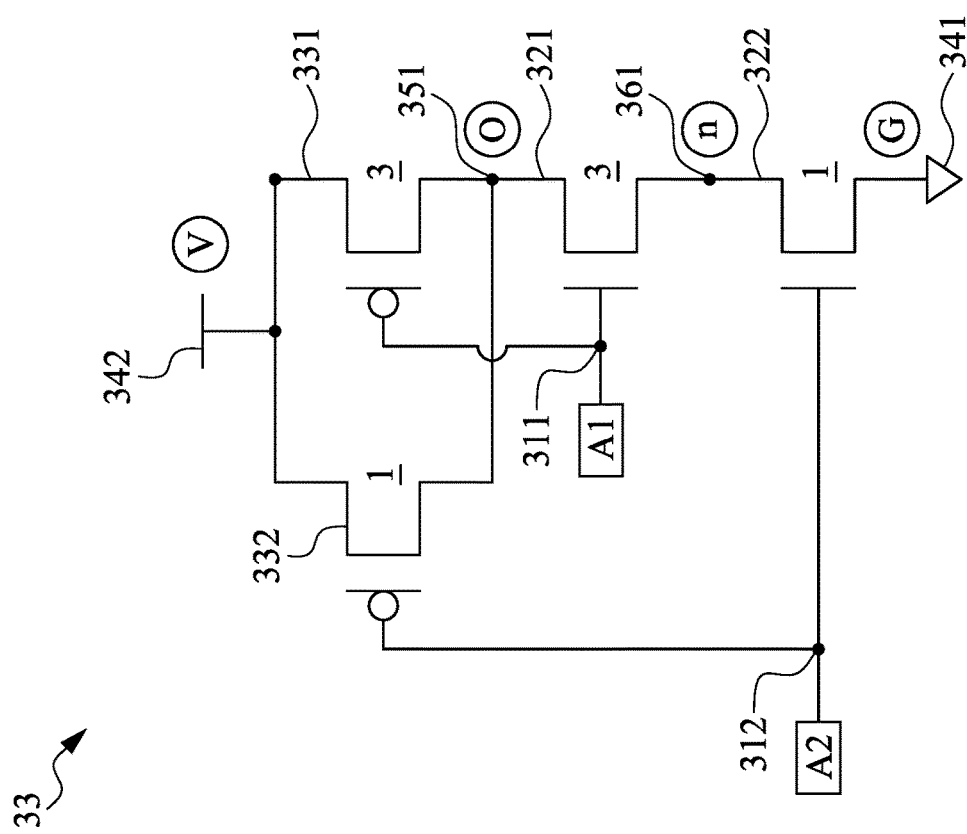
Figure 3E:
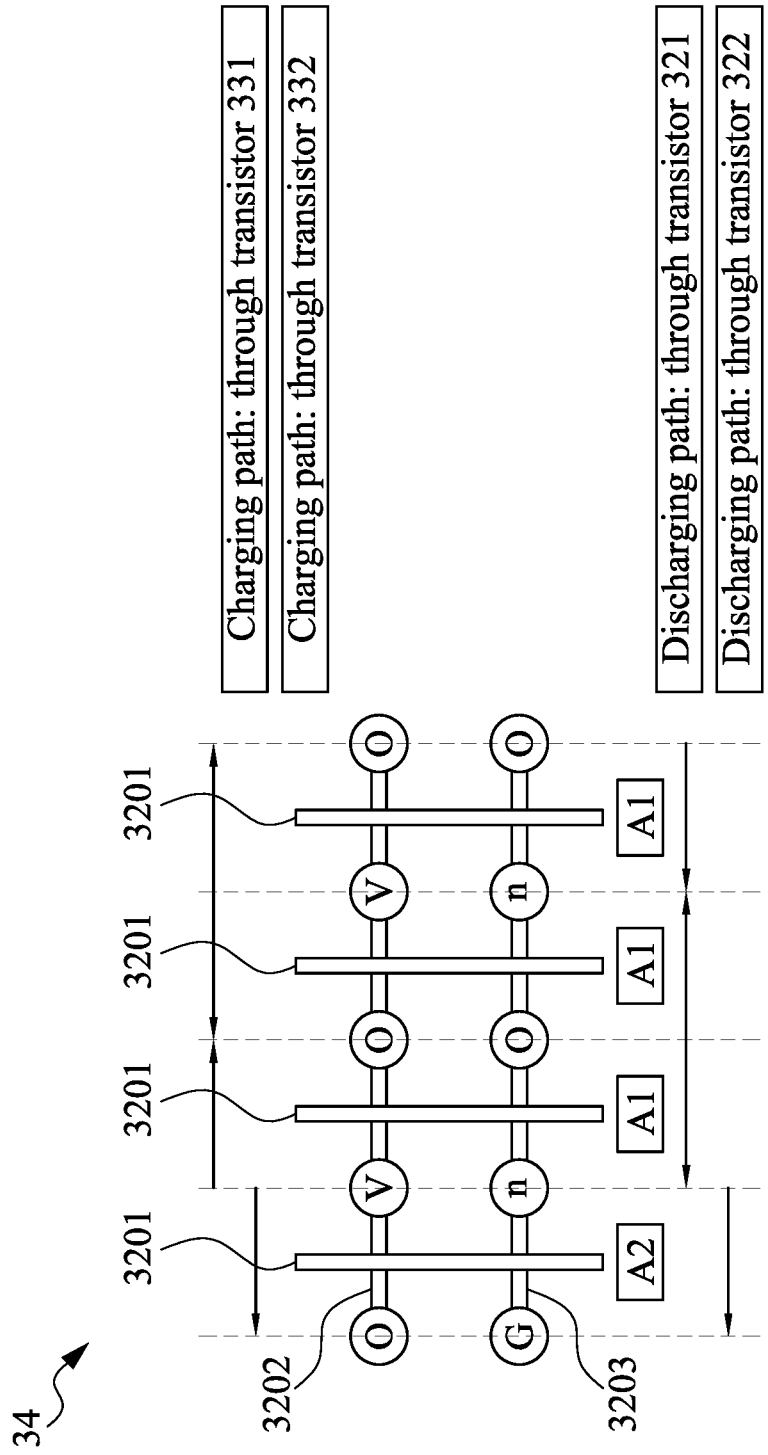

FIG. 3D illustrates a cell 33, which may be an asymmetrical variant of the cell 31 in FIG. 3A and may have a substantially identical area, according to some embodiments of the present disclosure. FIG. 3E illustrates an exemplary layout 34 of the cell 33 and helps explain the difference from the embodiment of FIGS. 3A/3B.

In the layout 34, three out of four of the gate regions 3201 are connected to the input A1, and one of the n-channel source/drain regions 3203 is connected to a different voltage node. The net effect is that now there exist three current paths that are controlled by the input A1 and along which electrical currents can flow from the reference voltage V through transistor 331 to the output O, as well as three current paths that are controlled by the input A1 and along which electrical currents can flow from the output node O through transistor 321 to the node n. This explains the two underlined digits "3" near the transistors 321, 331 in FIG. 3D.

In contrast, only one out of four of the gate regions 3201 is connected to the input A2, and hence there exists only one transistor segment each for the current flow from the reference voltage V through transistor 332 to the output O and for the current flow from the node n to the reference voltage G. This explains the two underlined digits "1" near the transistors 322, 332 in FIG. 3D.

In other words, the cell 33 and the layout 34 favor the input A1 more than the input A2. The net effect is that at substantially the same area and power consumption, the delay between the input A1 and the output node O is reduced, at the expense of an increased delay between the input A2 and the output node O.

Figure 3F:
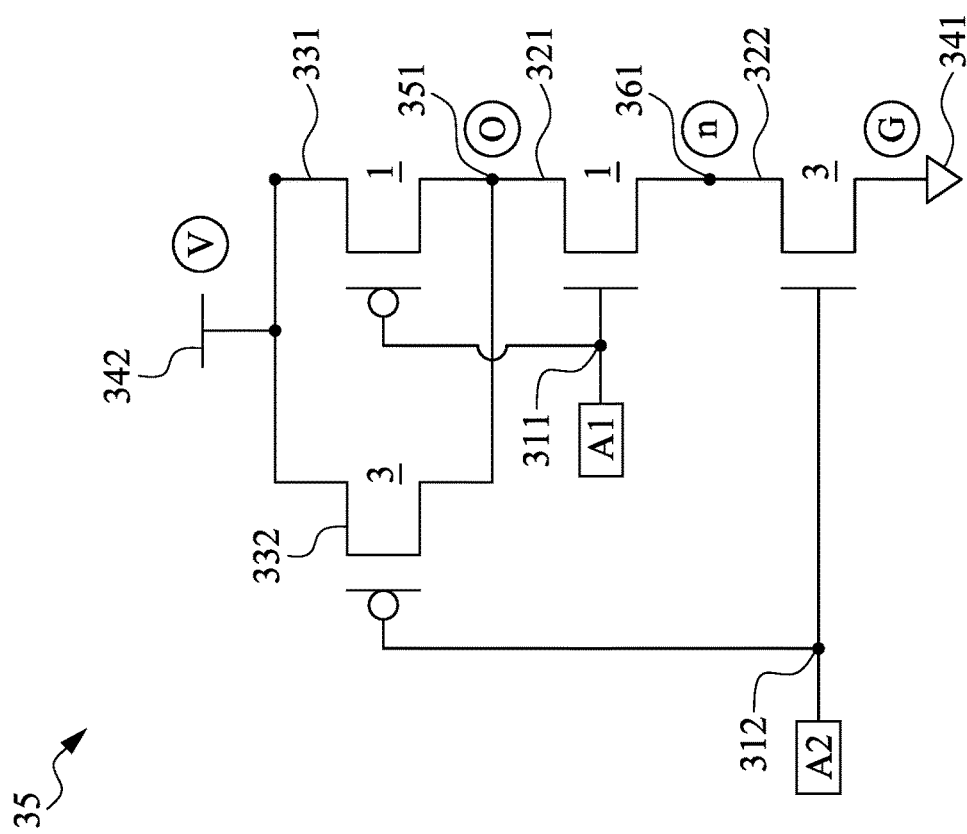
Figure 3G:
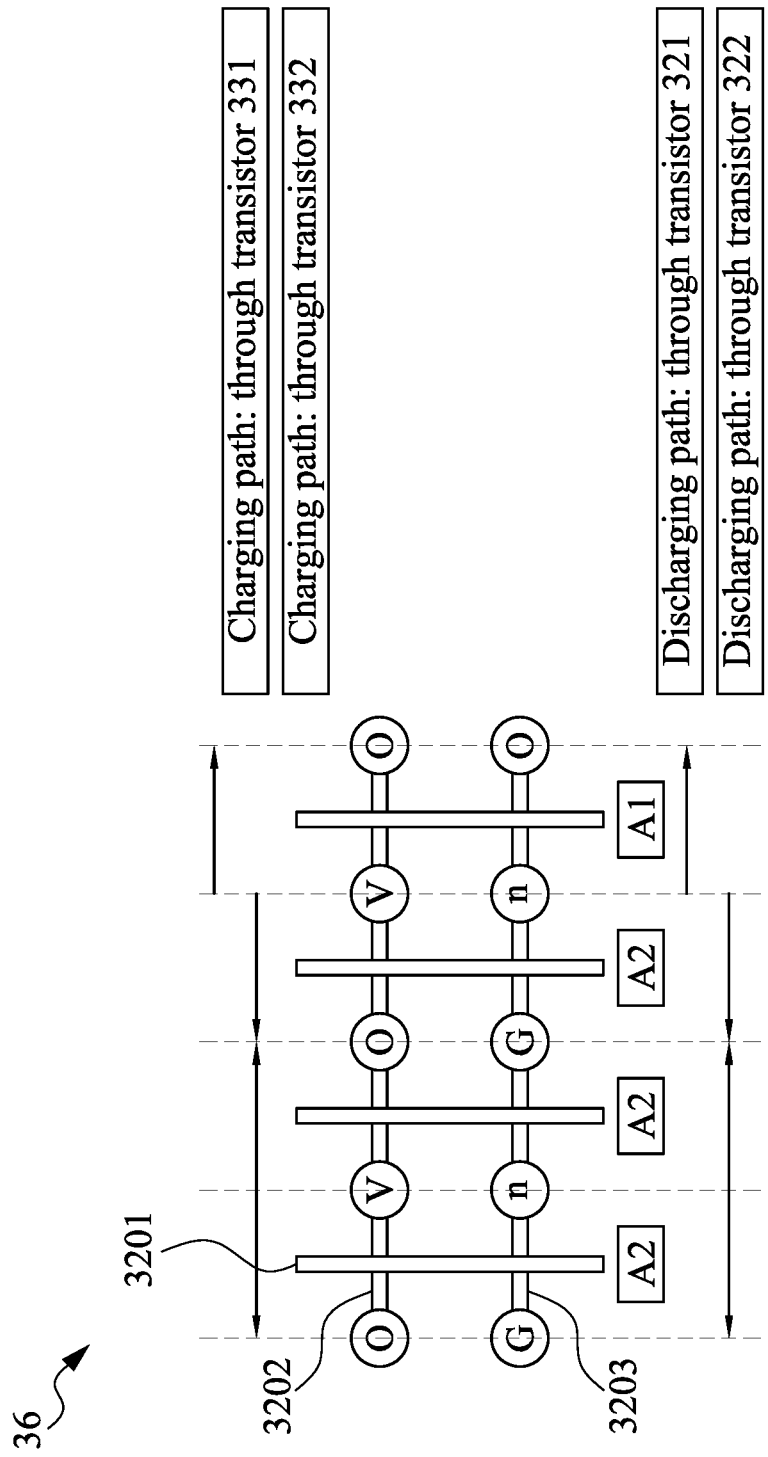

FIG. 3F illustrates a cell 35, which may be an asymmetrical variant of the cell 31 in FIG. 3A and may have a substantially identical area, according to some embodiments of the present disclosure. FIG. 3G illustrates an exemplary layout 36 of the cell 35 and helps explain the difference from the embodiment of FIGS. 3A/3B.

In the layout 36, three out of four of the gate regions 3201 are connected to the input A2, and two of the n-channel source/drain regions 3203 are connected to different voltage nodes. The net effect is that now there exist three current paths that are controlled by the input A2 and along which electrical currents can flow from the reference voltage V through transistor 331 to the output O, as well as three current paths that are controlled by the input A2 and along which electrical currents can flow from the node n through transistor 322 to the reference voltage G. This explains the two underlined digits "3" near the transistors 322, 332 in FIG. 3F.

In contrast, only one out of four of the gate regions 3201 is connected to the input A1, and hence there exists only one transistor segment each for the current flow from the reference voltage V through transistor 331 to the output O and for the current flow from the output O through transistor 321 to the node n. This explains the two underlined digits "1" near the transistors 321, 331 in FIG. 3F.

In other words, the cell 35 and the layout 36 favor the input A2 more than the input A1. The net effect is that at substantially the same area and power consumption, the delay between the input A2 and the output node O is reduced, at the expense of an increased delay between the input A1 and the output node O.

FIGS. 4A-4D illustrate other aspects of the asymmetrical arrangement in more detailed examples.

FIG. 4A illustrates the layout 41 of a programmable cell, according to some embodiments of the present disclosure.

The programmable cell illustrated in FIG. 4A may be provided as a standard cell in a cell library. Other standard cells with substantially the same size of some comparative approaches may have the electrical connection among the input nodes, the output node(s), the reference voltages and other intermediary nodes all pre-configured and pre-connected. In contrast, the standard cell represented by the layout 41 may leave some of the transistor segments unconnected to enable on-the-fly determination of the electrical connection by automatic placement and routing (APR) tools, based on criteria such as power consumption, speed and timing conditions.

For example, if the APR tools determine that the timing condition allows a 2-input NAND gate with symmetrical timing performance between the two inputs, then the APR tools may distribute the transistor segments evenly by assigning the gate regions to the respective inputs and connecting the unconnected transistor segments accordingly. An exemplary result is the cell having a layout 42 in FIG. 4B, which indicates that the APR tools have decided to assign two of the three un-connected gate regions to the input A1 and the other one to the input A2.

As another example, if the APR tools determine the timing condition is more beneficially resolved by favoring the input A1 in terms of timing, then the APR tools can assign all three un-connected gate regions to the input A1 and connect the transistor segments accordingly, as indicated in FIG. 4C. Similarly, if less delay at the input A2 is beneficial, then the APR tools can allocate two of the three un-connected gate regions to the input A2 and the other one to the input A1.

FIGS. 5A-5D exemplarily illustrate more detailed layouts of the cells already illustrated in FIGS. 4A-4D.

The electrical connection in a (standard) cell can be enabled by placing conductive materials in a polygonal shape. FIG. 5A illustrates a programmable standard cell similar to that of FIG. 4A, and additionally illustrates conductive feature 51 for connecting some transistor segments to the reference voltage V, conductive feature 52 for connecting other transistor segments to the output node O and conductive feature 53 for connecting other transistor segments to the reference voltage G.

Figure 5B:
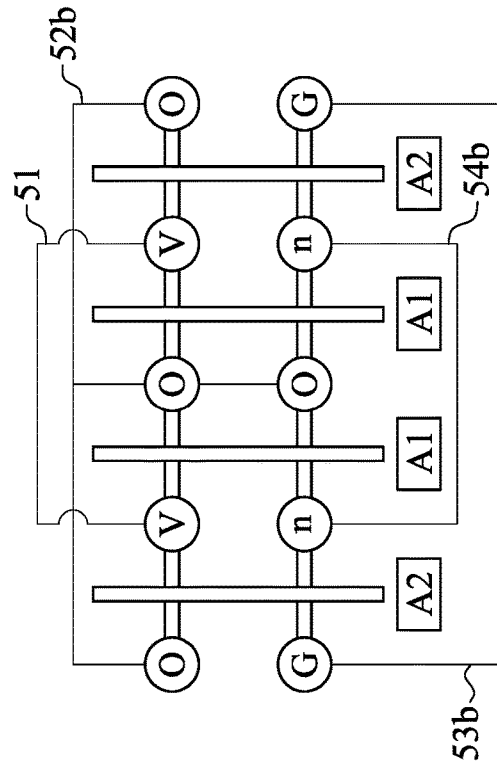
FIGS. 5A-5D illustrate circuit cells and layouts, in accordance with at least one embodiment of the present disclosure.
Figure 5D:
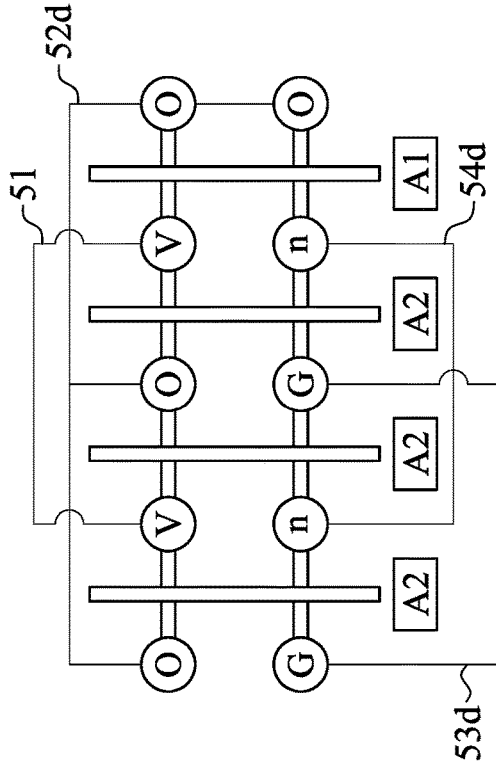
Figure 5A:
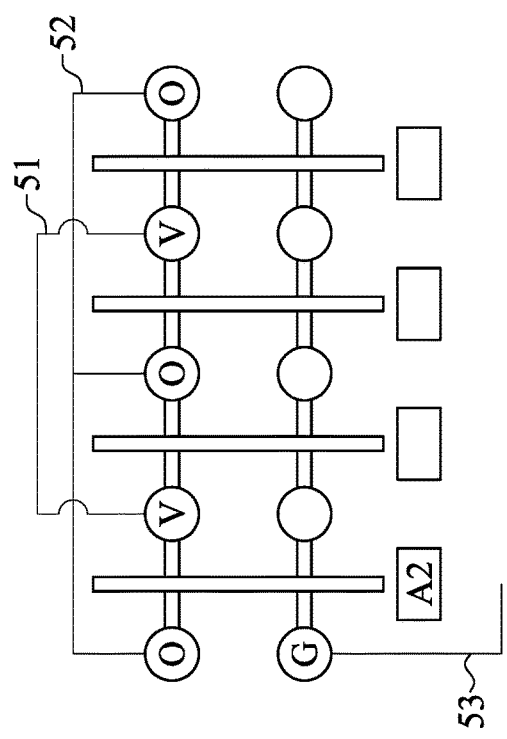

The APR tools may, after determining to make the programmable cell in FIG. 5A become a symmetrical cell as exemplarily shown in FIG. 5B, modify the conductive feature 52 to become conductive feature 52b by lengthening one of the fingers. The APR tools may also modify the conductive feature 53 to become conductive feature 53b and add conductive feature 54b to establish an electrical connection.

Figure 5C:
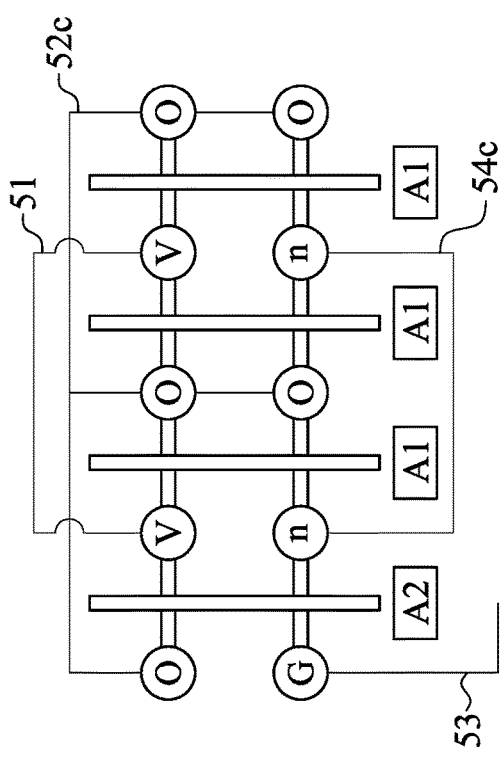

Similarly, the APR tools may create conductive features 52c and 54c to arrive at the asymmetrical cell favoring A1 as exemplarily shown in FIG. 5C, and may create conductive features 52d, 53d and 54d to arrive at the asymmetrical cell favoring A2 as exemplarily shown in FIG. 5D.

FIGS. 6A-6D illustrate the asymmetrical arrangement in more detailed examples.

Figure 6A:
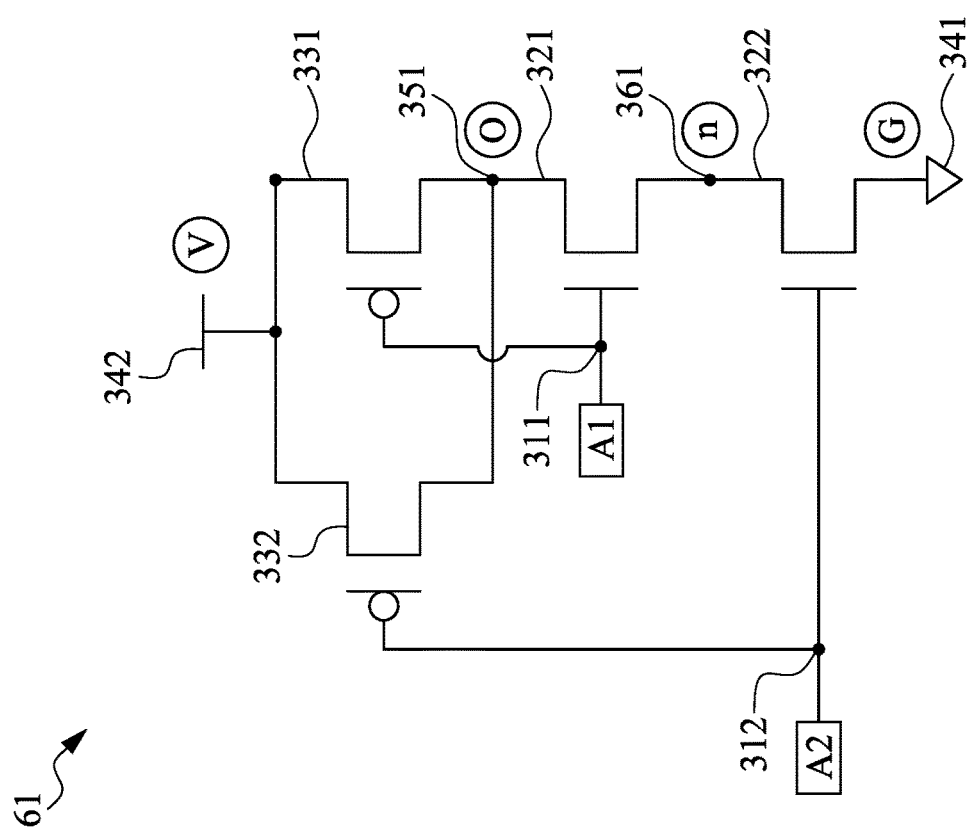

FIG. 6A illustrates a cell 61, which may be a logic cell or a standard cell, in a manner similar to FIG. 3A, according to some embodiments of the present disclosure. FIGS. 6B and 6C illustrate layouts 62 and 63 that can implement the cell 61, according to some embodiments of the present disclosure.

The layout 62 represents a D2 configuration (i.e., two transistor segments per input on average), whereas the layout 63 represents a D3 configuration (i.e., three transistor segments per input on average). The layout 63 has better timing performance with respect to both inputs A1 and A2, but at the same time occupies about 50 percent more area and consumes more power.

The asymmetric arrangement can help achieve an improved optimization among speed, area and power. Assume that only the input A2 of the cell 61 is on a timing-critical path and that the cell 61 implemented as the layout 62 does not meet the timing condition. Implementing the cell 61 as the layout 63 can resolve the timing issue by improving the speed at the input A2, but in the situation where the speed at the input A1 does not need to be improved, the additional power consumption and area can be further optimized.

FIG. 6D exemplarily illustrates a D2.5 configuration (i.e., two and a half transistor segments per input on average) according to some embodiments of the present disclosure. Compared to the layout 62, the layout 64 has two additional transistor segments assigned to the input A2, which helps to resolve the timing issue. At the same time, the layout 64 is smaller and consumes less power than the layout 63. In some embodiments, the configuration shown in FIG. 6D may be referred to as a D2.5-A2 configuration to additionally indicate that the input A2 is favored.

A library that provides all of the layouts 62, 63 and 64 for a 2-input NAND gate can provide more flexibility in optimizing power, size and speed than a library that provides only the symmetrical versions (i.e., only the layouts 62 and 63).

Figure 7A:
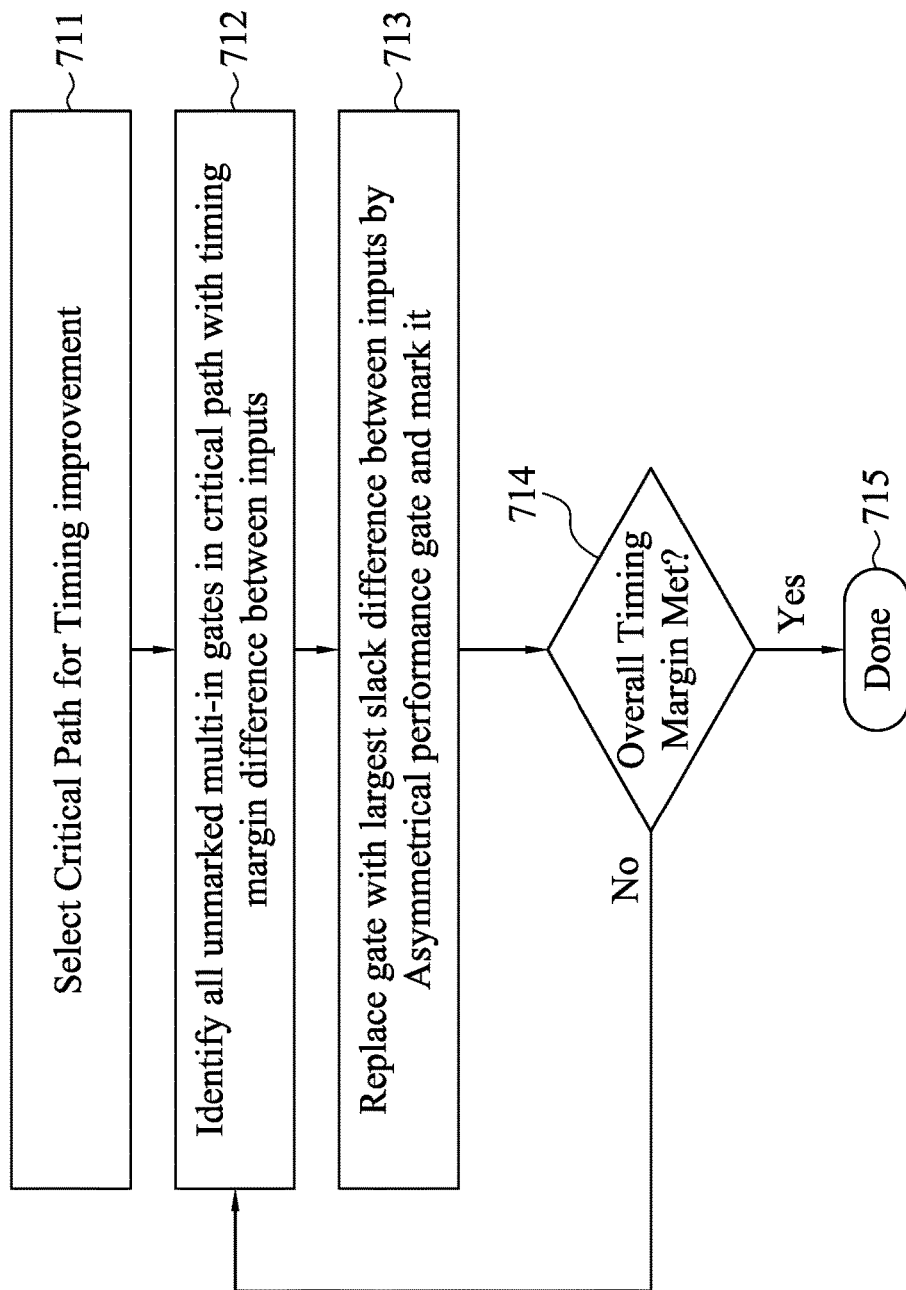
FIGS. 7A and 7B show exemplary method flowcharts, in accordance with at least one embodiment of the present disclosure.

FIG. 7A shows an exemplary method flowchart for improving the timing on a critical path by swapping existing gates with an asymmetrical performance gate, according to some embodiments of the present disclosure. The method is also applicable to swapping an existing asymmetrical performance gate with another gate with a higher amount of asymmetry.

At step 711, a critical path may be selected for timing improvement. At step 712, unmarked multi-in gates in the critical path with a timing margin difference between inputs may be identified. At step 713, the gate with the largest slack difference between its inputs may be replaced by an asymmetrical version; the replaced gate may be marked to indicate such replacement. At step 714, a timing condition is checked. If the circuit meets the given timing condition, then the flowchart ends at step 715. Otherwise, other unmarked multi-inputs gates will be swapped with an asymmetrical version.

Figure 7B:
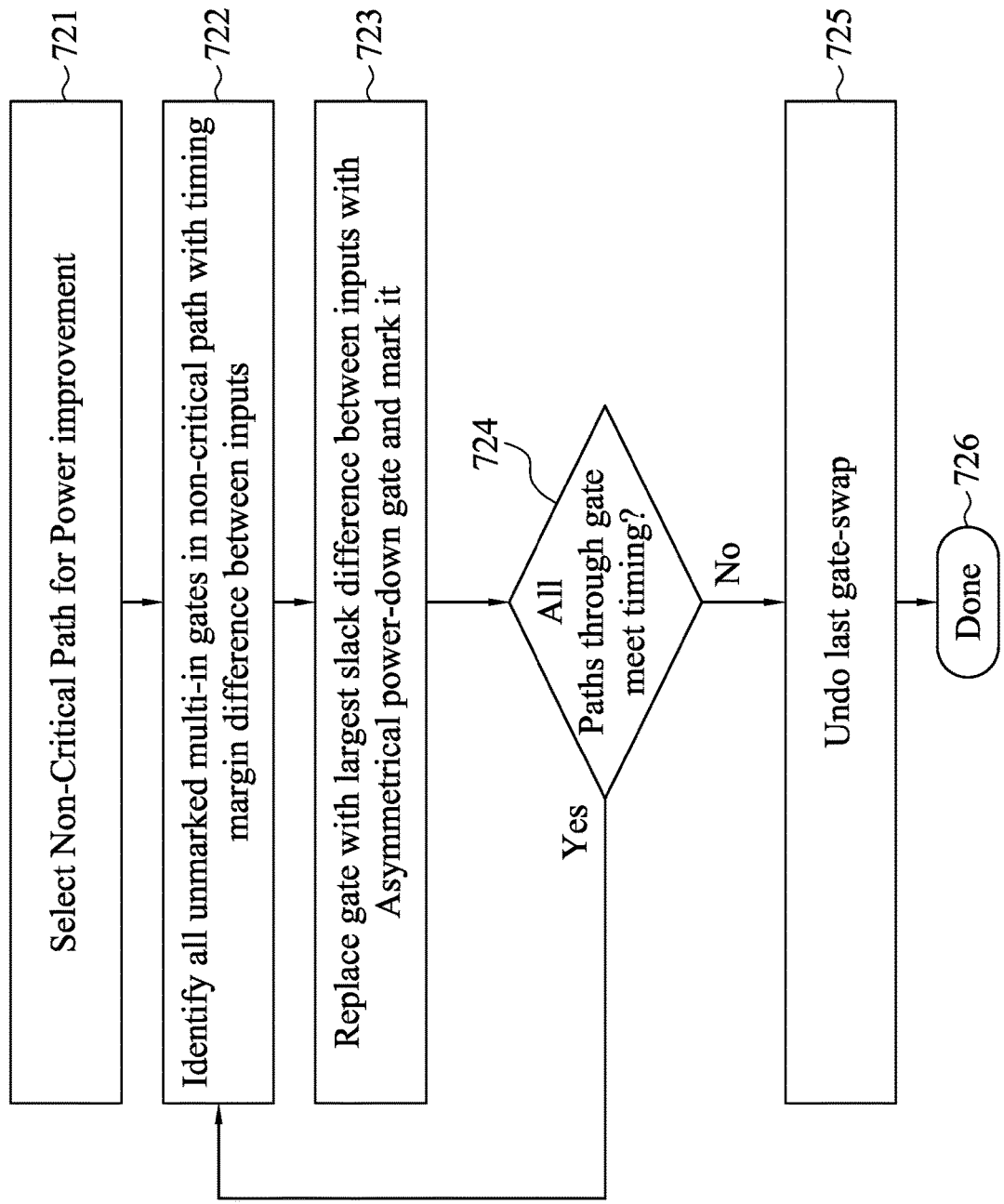

FIG. 7B shows an exemplary method flowchart for improving the power consumption on a non-critical path by swapping existing gates with an asymmetrical performance gate, according to some embodiments of the present disclosure. The concept is to downsize the non-critical input without impacting the critical input.

At step 721, a non-critical path for power improvement is selected. At step 722, unmarked multi-in gates in the non-critical path with a timing margin difference between inputs are marked. At step 723, the gate with largest slack difference between inputs is replaced with an asymmetrical power-down gate; the replaced gate may then be marked to indicate the replacement. At step 724, a timing condition is checked. If the circuit meets the given timing condition, then the flowchart can go back to step 722 for further reduction in power consumption. If, however, the timing condition is not passed, indicating that the limit of the power-speed tradeoff has been hit, then the last gate-swap is undone at step 725. The flowchart then ends at step 726.

Figure 8A:
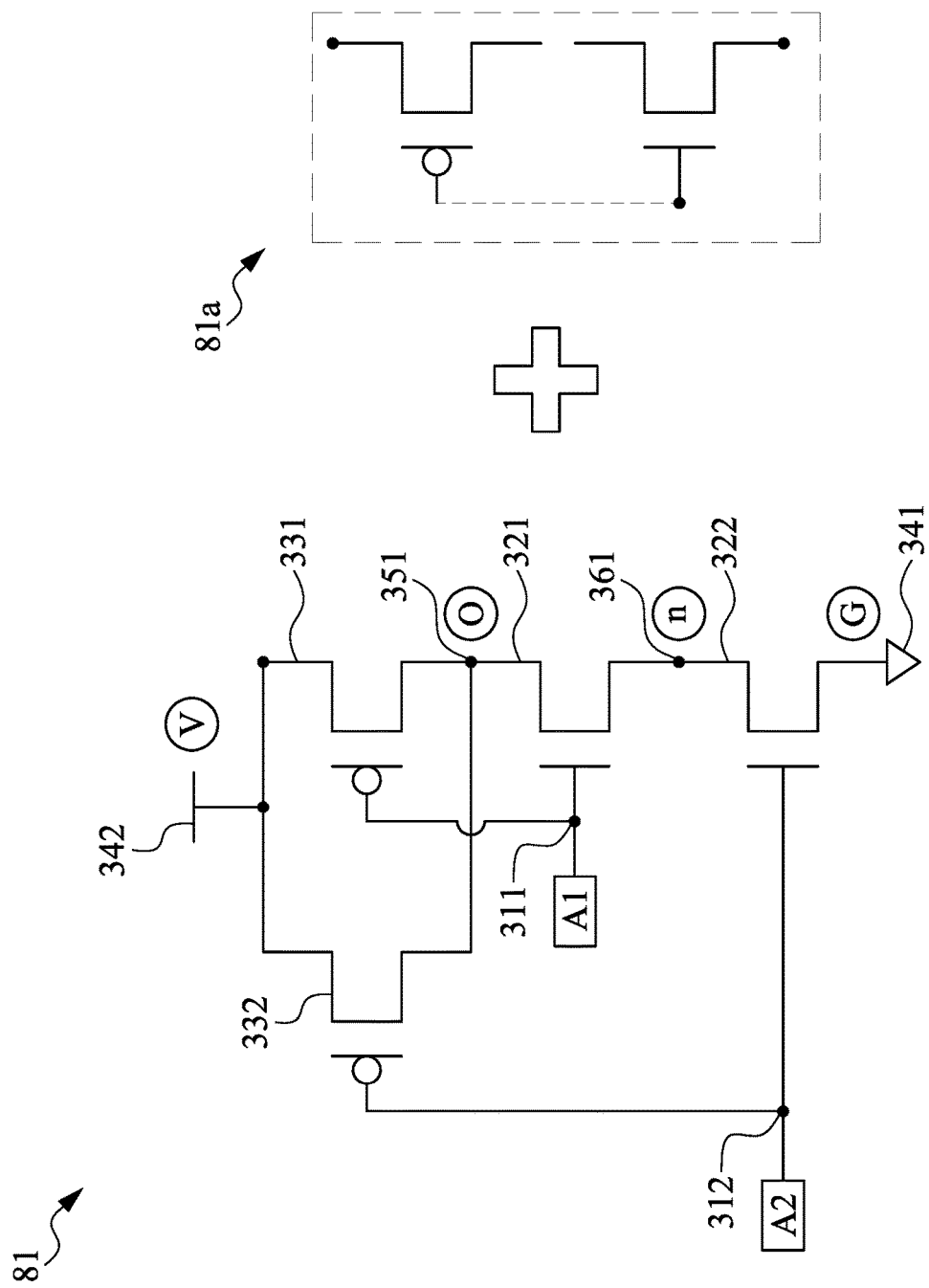
FIGS. 8A-8C illustrate circuit cells and layouts, in accordance with at least one embodiment of the present disclosure.
Figure 8B:
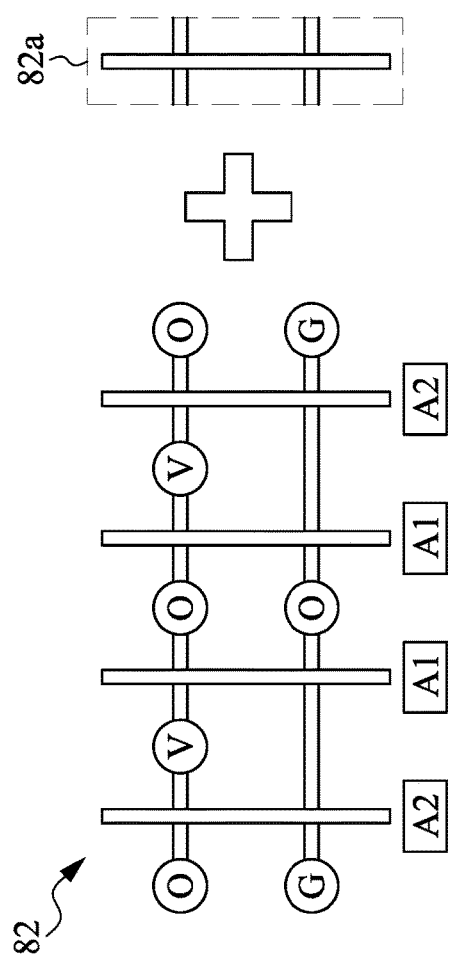

FIG. 8A illustrates a cell with a boosting device, according to some embodiments of the present disclosure; FIG. 8B exemplarily illustrates one way to form the corresponding layout, and FIG. 8C exemplarily illustrates the resulting layout.

FIG. 8A shows a cell 81 that represents a 2-input NAND-D2 along with a boost device 81a. The illustrated boost device 81a includes a pair of N- and P-transistor segments. The boost device, however, can include only one transistor segment; such boost device may be applicable to, for example, logic families that do not necessarily require complementary P and N devices (such as NMOS and PMOS logic).

The boost device 81*a* may be connected to an existing cell 81 (2-input-NAND-D2 in this example) and, after being connected, allocated to an input (A2 in this example) to boost the timing behavior associated with that input. Note that the connection between the gates of the N and P devices in the boost device 81*a* shown in FIG. 8A is optional.

Figure 8C:
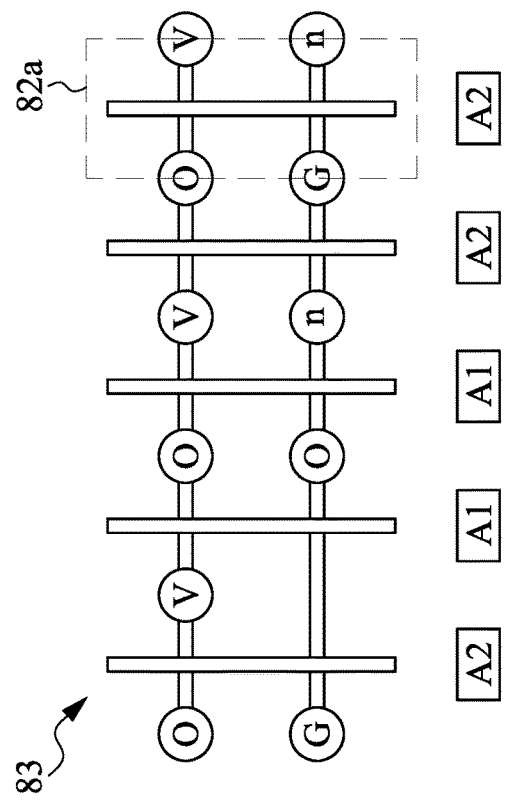

FIG. 8B illustrates two layouts 82 and 82*a* that correspond to the cell 81 and the boost device 81*a*, respectively; FIG. 8C illustrates the combined layout 83.

Compared to the embodiments related to FIGS. 6A-6D in which several standard cells of the same 2-input NAND gate have different sizes and asymmetry, the embodiments related to FIGS. 8A-8C provide the benefit of a more compact library. The reason is that instead of having three cells directed to the D2, D2.5 and D3 configurations as in FIGS. 6A-6D in the library, only a cell directed to the D2 configuration and a boost device are necessary to be placed in the library; the D2.5 and D3 and other configurations may be created by combining the cell 81 with an appropriate number of the boost devices 81*a* and preparing the associated electrical connection.

Figure 9A:
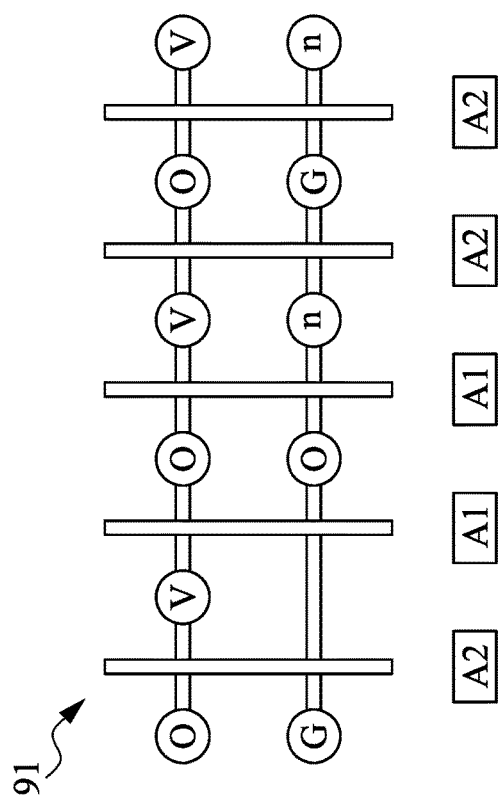
FIGS. 9A-9B illustrate circuit cells and layouts, in accordance with at least one embodiment of the present disclosure.
Figure 9B:
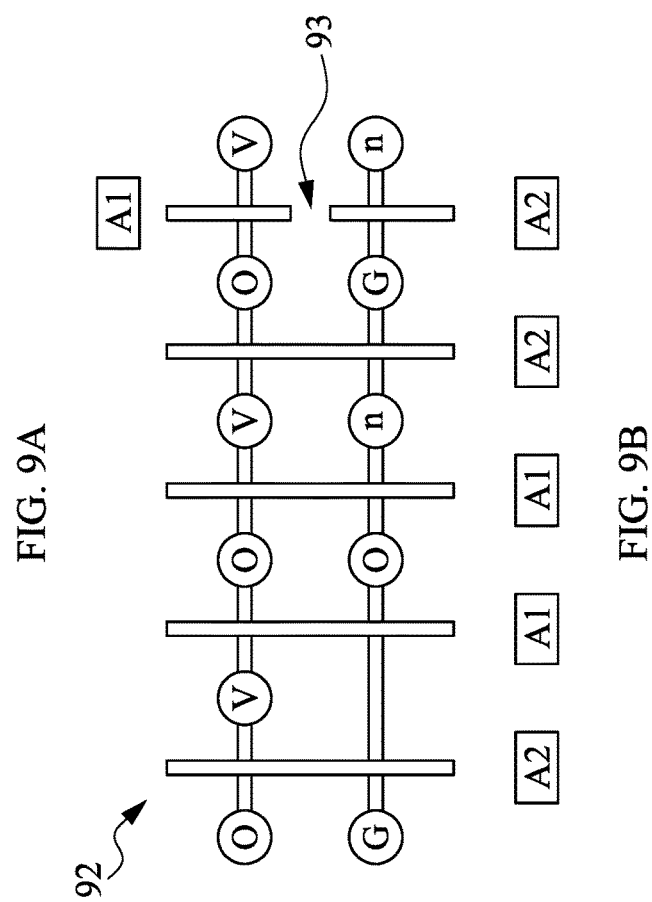

FIGS. 9A-9B illustrate another aspect of the application of concept of the asymmetrical arrangement in more detailed examples, according to some embodiments of the present disclosure.

FIG. 9A shows the layout 91 of a cell in a D2.5 configuration, in which the speed associated with the input A2 is favored.

FIG. 9B shows the layout 92 of a cell also in a D2.5 configuration but with a gap 93 in the rightmost gate region. The gap 93 allows different inputs to be connected to the seemingly paired N- and P-transistor segments. The input A1 gets an additional path for charging the capacitance at the output node (i.e., faster pull-up, which reduces the rise time), and the input A2 gets an additional path between the ground and the intermediary node n (i.e., faster pull-down, which reduces the fall time).

The embodiments of FIGS. 9A and 9B demonstrate the ability to tune the timing behavior in a finer manner. Not only can different inputs be differentiated, but also different delay components such as the rise time and fall time.

FIG. 10 shows simulation data demonstrating the performance improvement of the asymmetrical cells according to some embodiments of the present disclosure.

FIG. 10 lists the speed and power consumption of three 2-input NAND gates in the D2, D3 and D2.5-A2 configurations. In situations where the timing condition at the input A1 is acceptable but needs improvement with respect to the input A2, the D2.5-A2 configuration provides satisfactory improvement to the delay between the input A2 and the output while occupying less area (6 CPP) than the D3 configuration (7 CPP). The D2.5-A2 configuration also consumes less power than the D3 configuration.

Figure 11:
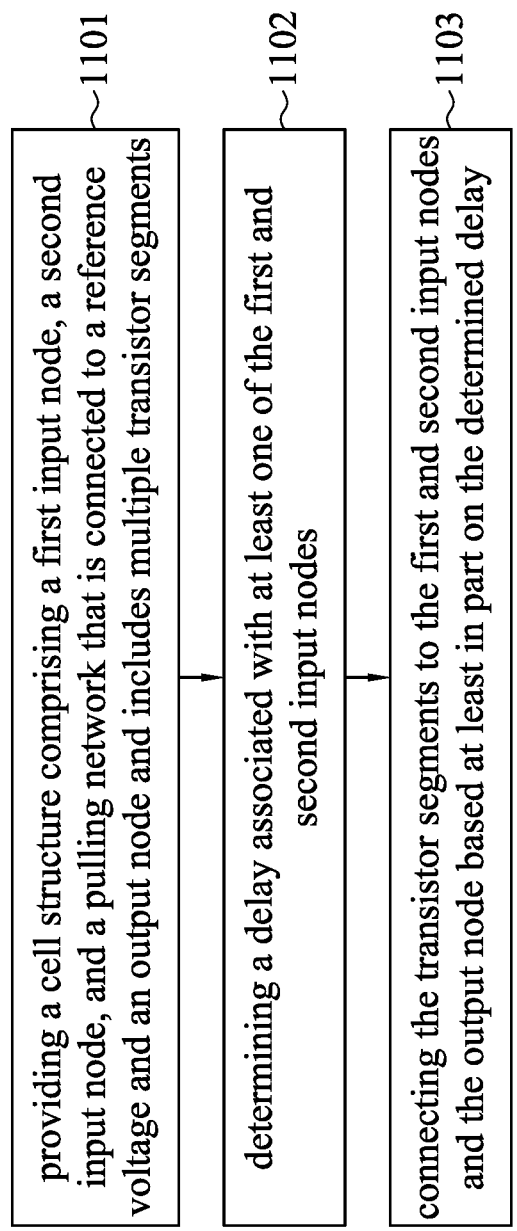

FIG. 11 is a flowchart showing an exemplary method of forming an integrated circuit structure, according to some embodiments of the present disclosure.

At step 1101, a cell structure is provided. The cell structure may include a first input node, a second input node, and a pulling network that is connected to a reference voltage and an output node. The pulling network may include multiple transistor segments.

At step 1102, a delay is determined. The delay may be associated with at least one of the first and second input nodes.

At step 1103, the transistor segments may be electrically connected to the first and second input nodes and the output node based at least in part on the determined delay.

In some embodiments, whether the delay is timing-critical may be determined. In some embodiments, in response to the determination that the delay is timing-critical, the plurality of transistor segments are connected to the first input node, the second input node and the output node such that the input node associated with the determined delay controls a higher amount of current-driving capability of the plurality of transistor segments than the other input node. In some embodiments, in response to the determination that the delay is timing-critical, an additional transistor segment connected to the input node associated with the determined delay may be added. In some embodiments, in response to the determination that the delay not is timing-critical, a transistor segment connected to the input node associated with the determined delay may be removed from the plurality of the transistor segments.

In some embodiments, each of the plurality of transistor segments may be associated with a substantially identical current-driving capability. In some embodiments, each of the plurality of transistor segments may have a substantially identical channel width.

In some embodiments, each of the plurality of transistor segments may have a substantially identical width measured in CPP.

In some embodiments, the pulling network is a first pulling network and the reference voltage is a first reference voltage and the plurality of transistor segments are a first plurality of transistor segments, wherein the logic cell structure further comprises: a second pulling network connected to a second reference voltage and the output node, wherein the second pulling network comprises a second plurality of transistor segments. In some embodiments, connecting the plurality of transistor segments to the first input node, the second input node and the output node based at least in part on the determined delay comprises: connecting the first and second pluralities of transistor segments to the first input node, the second input node and the output node based at least in part on the determined delay. In some embodiments, the first plurality of transistor segments are n-channel transistor segments and the second plurality of transistor segments are p-channel transistor segments. In some embodiments, the first pulling network is a pull-down network and the second pulling network is a pull-up network.

In some embodiments, determining a delay associated with at least one of the first input node and the second input node comprises: determining an additional delay associated with an additional logic cell structure connected to the logic cell structure.

In some embodiments, the logic cell structure is an AND gate, an OR gate, a NOR gate, a NAND gate, an XOR gate, or a flip-flop. In some embodiments, the method may include fabricating the logic cell structure on a semiconductor wafer, which may in turn include exposing the semiconductor wafer to a radiation that is patterned based at least in part on the logic cell structure. In some embodiments, the plurality of transistor segments are field-effect transistors (FETs).

FIG. 12 is a flowchart showing an exemplary method of forming an integrated circuit structure, according to some embodiments of the present disclosure.

At step 1201, a timing condition of a logic cell having multiple inputs may be addressed by allocating a current-driving capability of the logic cell unequally among the inputs without substantially changing a size of the logic cell.

In some embodiments, the current-driving capability is provided by a plurality of transistor segments of the logic cell, each plurality of transistor segments comprising a control terminal. In some embodiments, the plurality of transistor segments are FETs and the control terminal is a gate. In some embodiments, allocating a current-driving capability of the logic cell unequally among the plurality of inputs comprises: connecting a first input of the plurality of inputs to a first number of transistor segments that is larger than other numbers of transistor segments connected to the other inputs.

In the forgoing embodiments, logic gates such as an AND gate, an OR gate, an XOR gate, a NOT gate (invertor), a NAND gate, a NOR gate, and/or an XNOR gate are realized by the smallest height standard cells, and a combinational logic circuit such as a multiplexer, an AND-OR-Invert (AOI) logic and/or an OR-AND-Invert (OAI) logic are realized by the standard cells having cell heights higher than those for simple logic gates.

Figure 13:
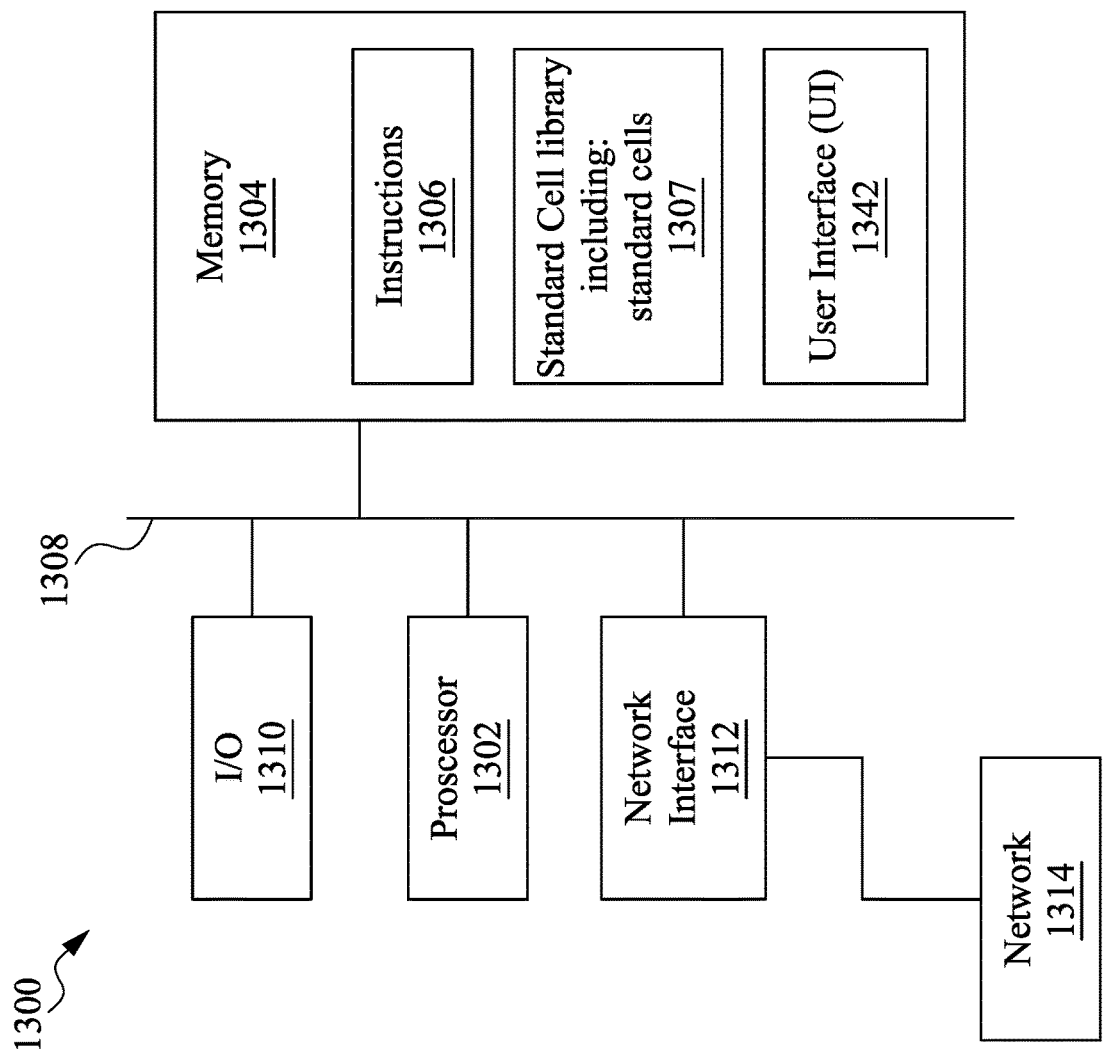
FIG. 13 is a block diagram of an electronic design automation (EDA) system, in accordance with some embodiments.

FIG. 13 is a block diagram of an electronic design automation (EDA) system 1300, in accordance with some embodiments. The EDA system 1300 may include an APR system. Methods described herein of making logic cells, providing libraries of standard cells, and generating layout diagrams in accordance with one or more embodiments, are implementable, for example, using the EDA system 1300.

The EDA system 1300 may be a general-purpose computing device including a hardware processor 1302 and a non-transitory, computer-readable storage medium 1304. The storage medium 1304 may be encoded with, i.e., stores, computer program codes 1306, i.e., a set of executable instructions. Execution of the instructions 1306 by the processor 1302 represents (at least in part) an EDA tool which implements a portion or all of, e.g., the methods described herein.

The processor 1302 is electrically coupled to the storage medium 1304 and an I/O interface 1310 via a bus 1308. A network interface 1312, connected to a network 1314 for external communication, may be additionally connected to the processor 1302. Network interface 912 is connected to a network 914. The processor 902 may be a central processing unit (CPU), a multi-processor, a distributed processing system, an application specific integrated circuit (ASIC), and/or a suitable processing unit.

The storage medium 1304 may be an electronic, magnetic, optical, electromagnetic, infrared, and/or a semiconductor system (or apparatus or device). For example, the storage medium 1304 may include a semiconductor or solid-state memory, a magnetic tape, a removable computer diskette, a random access memory (RAM), a read-only memory (ROM), a rigid magnetic disk, and/or an optical disk. In one or more embodiments using optical disks, the storage medium 1304 includes a compact disk-read only memory (CD-ROM), a compact disk-read/write (CD-R/W), and/or a digital video disc (DVD).

The storage medium 1304 may store instructions 1306 configured to cause the system 1300 (where such execution represents (at least in part) the EDA tool)) to be usable for performing a portion or all of the noted processes and/or methods. In one or more embodiments, the storage medium 1304 may store a library 1307 of standard cells including such standard cells as disclosed herein.

The I/O interface 1310 may be a keyboard, keypad, mouse, trackball, trackpad, touchscreen, and/or cursor direction keys for communicating information and commands to the processor 1302. The EDA system 1300 may be configured to receive information related to a UI through the I/O interface 1310. The information may be stored in the 1304 as user interface (UI) 1342.

The network interface 1312 may include wireless network interfaces such as BLUETOOTH, WIFI, WIMAX, GPRS, or WCDMA; or wired network interfaces such as ETHERNET, USB, or IEEE-1364.

Figure 14:
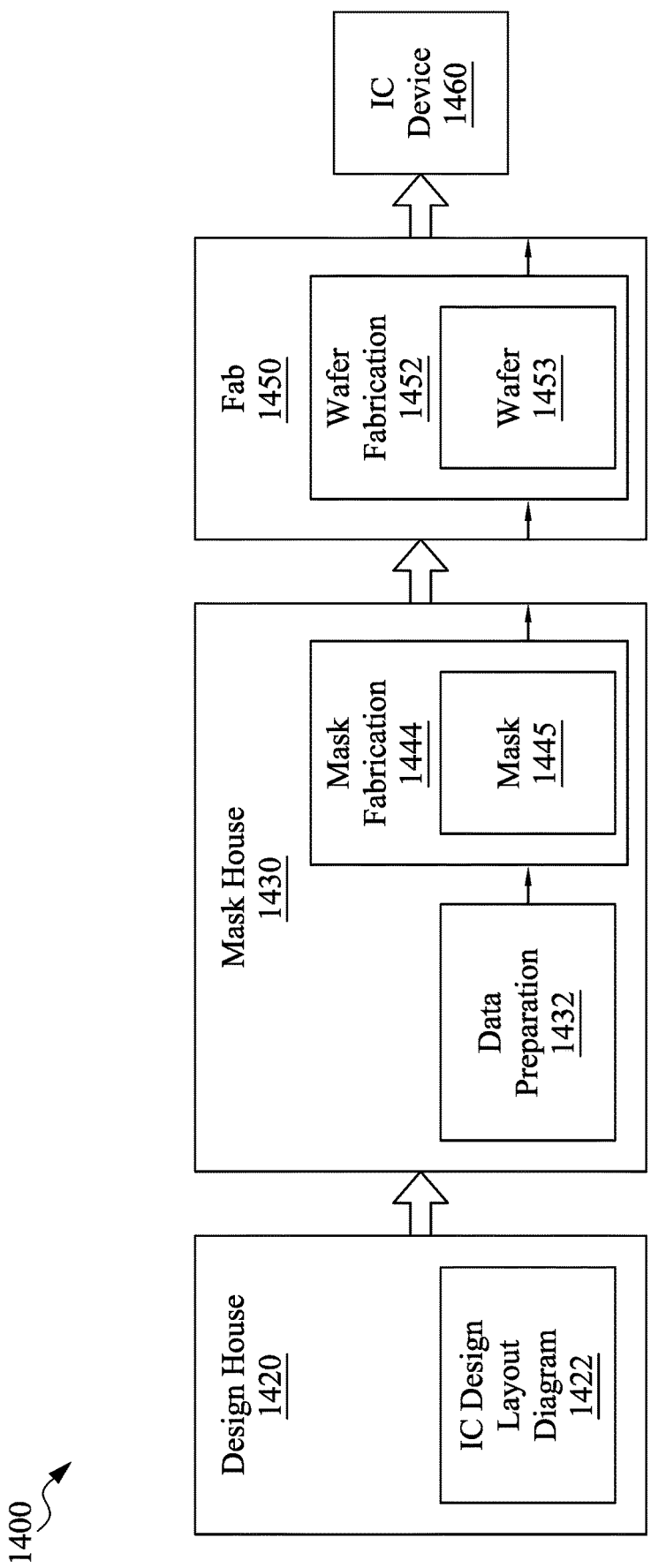
FIG. 14 shows a block diagram of an IC manufacturing system and an associated manufacturing flow, in accordance with some embodiments.

The design and fabrication of an integrated circuit (IC) is a collective effort. FIG. 14, which is a block diagram of an IC manufacturing system 1400 and an associated manufacturing flow, shows an example of how such collective effort is arranged. The system 1400 may be used to fabricate, based on a layout diagram, one or more photomasks, or at least one component in a layer of an IC, or a combination of both.

The system 1400 includes entities that interact and communicate with one another during the design, development, and manufacturing cycles related to the manufacturing of an IC device 1460. These entities may include a design house 1420, a mask house 1430, and an IC manufacturer/fabricator ("fab") 1450. A plurality of these entities may be owned by a single company, or may coexist in a common facility with shared resources.

The design house (or design team) 1420 generates an IC design layout diagram 1422 that includes various geometrical patterns for the IC device 1460. These patterns may correspond to patterns of different materials (such as metal, oxide and semiconductor) and in different layers of the IC device 1460, the patterns of which may combine to form various features, such as active regions, (gate) electrodes, sources/drains, metal lines, vias, openings for bonding pads, and optical devices.

The IC design layout diagram 1422 is presented in data files (such as GDSII or DFII file format) with information on the patterns, and may conform to various characteristics suitable for subsequent mask and wafer fabrication.

The mask house 1430 performs mask data preparation 1432 and mask fabrication 1444 to produce mask(s) 1445 based at least in part on the layout diagram 1422.

The fab 1450 includes wafer fabrication 1452, which turns out wafers 1453 that will become IC devices 1460, and may have a variety of manufacturing facilities for that end. For example, different such facilities may be employed to make the FEOL and BEOL sections. The fab 1450 directly uses mask(s) 1445 and therefore at least indirectly uses the layout diagram 1422 in the making of the IC devices 1460.

One of the fabrication steps is the (photolithographic) transferal of patterns to the wafer 1453. The patterns can be at the scale of nanometers, so their location in each of the layers has to be carefully defined during the circuit design stage. Also, the manufacturing process is carefully controlled to ensure accuracy in the placement of the patterns.

In the present disclosure, improved cells and cells structures are disclosed, along with related methods. The cells may favor one of the inputs for timing performance at the same cell size and approximately the same power consumption.

It will be understood that not all advantages have been necessarily discussed herein, no particular advantage is required for all embodiments or examples, and other embodiments or examples may offer different advantages.

Any of the embodiments described herein may be used alone or together in any combination. The one or more implementations encompassed within this specification may also include embodiments that are only partially mentioned or alluded to or not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

According to an aspect of the present disclosure, a method of forming an integrated circuit structure is provided. The method includes: providing a logic cell structure including a first input node, a second input node, and a pulling network connected to a reference voltage and an output node, wherein the pulling network includes a plurality of transistor segments; determining a delay associated with at least one of the first input node and the second input node; and connecting the plurality of transistor segments to the first input node, the second input node and the output node based at least in part on the determined delay.

According to an aspect of the present disclosure, a method of making an integrated circuit structure is provided. The method includes: addressing a timing condition of a logic cell having a plurality of inputs by allocating a current-driving capability of the logic cell unequally among the plurality of inputs without substantially changing a size of the logic cell.

According to an aspect of the present disclosure, an integrated circuit logic cell structure is provided. The cell structure may include: a first input node; a second input node; and a pulling network including a plurality of transistor segments, each of the plurality of transistor segments including a gate region, a first source/drain region and a second source/drain region, wherein each of the plurality of transistor segments includes a substantially identical width. The first input node may be electrically connected to the gate region of a first number of the transistor segments and the second input node may be electrically connected to the gate region of a second number of the transistor segments. The first number may differ from the second number.

In some embodiments, the pulling network is electrically connected to an output node and a reference voltage. The pulling network may be a pull-down network and the reference voltage may be a ground voltage. The pulling network may be configured to change a voltage level of the output node to a logical high level or a logical low level in response to a voltage level at the first input node and a voltage level at the second input node. A first speed at which the pulling network is configured to change the voltage level of the output node to a logical high level or a logical low level in response to the voltage level at the first input node may be associated with the first number; and a second speed at which the pulling network is configured to change the voltage level of the output node to a logical high level or a logical low level in response to the voltage level at the second input node may be associated with the second number. One of the logical high level and the logical low level may correspond to the reference voltage.

In some embodiments, the first number is associated with a first current-driving capability and the second number is associate with a second current-driving capability.

In some embodiments, the first number may be greater than the second number. The first input node may be associated with a timing-critical path.

In some embodiments, the pulling network is a first pulling network including a third plurality of transistor segments, wherein the substantially identical width is a first width, wherein the integrated circuit logic cell structure further includes: a second pulling network (331, 332) including a fourth plurality of transistor segments, each of the fourth plurality of transistor segments including a gate region, a first source/drain region and a second source/drain region, wherein each of the fourth plurality of transistor segments includes a second width substantially identical to each other.

In some embodiments, the first input node may be electrically connected to the gate region of a fifth number of the fourth plurality of transistor segments and the second input node may be electrically connected to the gate region of a sixth number of the fourth plurality of transistor segments. The fifth number may differ from the sixth number. The fifth number may be greater than the sixth number. The first input node may be associated with a timing-critical path. The first number may be identical to the fifth number. The second number may be identical to the sixth number. The first number may differ from the fifth number. The second number may differ from the sixth number.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of making an integrated circuit structure, the method comprising:
    addressing a timing condition of a logic cell having a plurality of inputs by allocating a current-driving capability of the logic cell unequally among the plurality of inputs without substantially changing a size of the logic cell.

2. The method of claim 1, wherein the current-driving capability is provided by a plurality of transistor segments of the logic cell, each plurality of transistor segments comprising a control terminal.

3. The method of claim 2, wherein the plurality of transistor segments are FETs and the control terminal is a gate.

4. The method of claim 2, wherein allocating a current-driving capability of the logic cell unequally among the plurality of inputs comprises:
    connecting a first input of the plurality of inputs to a first number of transistor segments that is larger than other numbers of transistor segments connected to the other inputs.

5. The method of claim 2, wherein allocating a current-driving capability of the logic cell unequally among the plurality of inputs comprises:
    determining a delay associated with at least one of the plurality of inputs;
    determining whether the delay is timing-critical; and
    in response to the determination that the delay is timing-critical, adding an additional transistor segment connected to the input associated with the determined delay.

6. The method of claim 5, wherein each of the plurality of transistor segments has a substantially identical channel width.

7. The method of claim 2, wherein allocating a current-driving capability of the logic cell unequally among the plurality of inputs comprises:
   determining a delay associated with at least one of the plurality of inputs;
   determining whether the delay is timing-critical; and
   in response to the determination that the delay not is timing-critical, removing a transistor segment connected to the input node associated with the determined delay from the plurality of the transistor segments.

8. The method of claim 2, wherein each of the plurality of transistor segments is associated with a substantially identical current-driving capability.

9. The method of claim 1, further comprising:
   fabricating the logic cell structure on a semiconductor wafer.

10. A non-transitory computer-readable storage medium comprising executable instructions that, when executed, causes a processor to perform a method comprising:
    addressing a timing condition of a logic cell having a plurality of inputs by allocating a current-driving capability of the logic cell unequally among the plurality of inputs without substantially changing a size of the logic cell.

11. The non-transitory computer-readable storage medium of claim 10, wherein the current-driving capability is provided by a plurality of transistor segments of the logic cell, each plurality of transistor segments comprising a control terminal.

12. The non-transitory computer-readable storage medium of claim 11, wherein the plurality of transistor segments are FETs and the control terminal is a gate.

13. The non-transitory computer-readable storage medium of claim 11, wherein allocating a current-driving capability of the logic cell unequally among the plurality of inputs comprises:
    connecting a first input of the plurality of inputs to a first number of transistor segments that is larger than other numbers of transistor segments connected to the other inputs.

14. The non-transitory computer-readable storage medium of claim 11, wherein allocating a current-driving capability of the logic cell unequally among the plurality of inputs comprises:
    determining a delay associated with at least one of the plurality of inputs;
    determining whether the delay is timing-critical; and
    in response to the determination that the delay is timing-critical, adding an additional transistor segment connected to the input associated with the determined delay.

15. The non-transitory computer-readable storage medium of claim 11, wherein allocating a current-driving capability of the logic cell unequally among the plurality of inputs comprises:
    determining a delay associated with at least one of the plurality of inputs;
    determining whether the delay is timing-critical; and
    in response to the determination that the delay not is timing-critical, removing a transistor segment connected to the input node associated with the determined delay from the plurality of the transistor segments.

16. The non-transitory computer-readable storage medium of claim 11, wherein each of the plurality of transistor segments is associated with a substantially identical current-driving capability.

17. The non-transitory computer-readable storage medium of claim 16, wherein each of the plurality of transistor segments has a substantially identical channel width.

18. A method of making an integrated circuit structure, the method comprising:
    providing a logic cell structure comprising a first input node and a second input node;
    allocating a first current-driving capability of the first input node; and
    allocating a second current-driving capability of the second input node;
    wherein the first and second current-driving capabilities are provided by a plurality of transistor segments of the integrated circuit structure, each plurality of transistor segments comprising a control terminal, and wherein the first current-driving capability is different from the second current-driving capability.

19. The method of claim 18, wherein the plurality of transistor segments are FETs and the control terminal is a gate.

20. The method of claim 18, wherein each of the plurality of transistor segments is associated with a substantially identical current-driving capability.

* * * * *